United States Patent [19]
Kovač et al.

[11] Patent Number: 5,659,362
[45] Date of Patent: Aug. 19, 1997

[54] VLSI CIRCUIT STRUCTURE FOR IMPLEMENTING JPEG IMAGE COMPRESSION STANDARD

[75] Inventors: Mario Kovač, Zagrer, Croatia; Nagarajan Ranganathan, Tampa, Fla.

[73] Assignee: University of South Florida, Tampa, Fla.

[21] Appl. No.: 302,110

[22] Filed: Sep. 7, 1994

[51] Int. Cl.$^6$ .................. H04N 7/32; H04N 7/30
[52] U.S. Cl. ........................ 348/384; 348/390
[58] Field of Search .................. 348/384, 390; 358/426, 432–33; 382/56; 395/163; H04N 7/133, 7/137, 7/32, 7/30

[56] References Cited

U.S. PATENT DOCUMENTS

| | | | |
|---|---|---|---|
| 5,051,840 | 9/1991 | Watanabe et al. | 358/433 |
| 5,101,280 | 3/1992 | Moronaga et al. | 358/426 |
| 5,129,015 | 7/1992 | Allen et al. | 382/56 |
| 5,189,530 | 2/1993 | Fujii | 358/458 |
| 5,253,078 | 10/1993 | Balkanski et al. | 358/426 |
| 5,260,808 | 11/1993 | Fujii | 358/458 |
| 5,283,656 | 2/1994 | Sugahara | 358/261.1 |
| 5,289,577 | 2/1994 | Gonzales et al. | 395/163 |
| 5,295,077 | 3/1994 | Fukuoka | 358/479 |
| 5,319,724 | 6/1994 | Blonstein et al. | 382/56 |
| 5,339,265 | 8/1994 | Liu et al. | 364/725 |
| 5,379,351 | 1/1995 | Fandrianto et al. | 382/41 |
| 5,444,542 | 8/1995 | Hoshi et al. | 348/384 |
| 5,450,599 | 9/1995 | Horvath et al. | 395/800 |
| 5,452,466 | 9/1995 | Fettweis | 395/800 |
| 5,467,131 | 11/1995 | Bhaskaran et al. | 348/384 |

OTHER PUBLICATIONS

Ching-Te Chiu et al, "Real-Time Parallel and Fully Pipelined Two-Dimensional DCT Lattice Structures with Application to HDTV Systems", IEEE Trans. on Cir. and Systems for Video Technology, vol. 2, No. 1, Mar. 1992, p. 25–37.

"VLSI Implementation of a 16×16 Discrete Cosine Transform", IEEE Trans. on Cir. & Sys., vol. 36, No. 4, Apr. 1989, pp. 610–617.

"A 100-MHz 2-D Discrete Cosine Transform Core Processor", IEEE Journal of Solid State Circuits, Uramoto et al, vol. 27, No. 4, Apr. 1992, pp. 492–499.

"VLSI Implementation of Single Chip JPEG Codec", Chen et al, IEEE VLSITSA, 1993, pp. 189–193.

"A VLSI Chip for Variable Length Encoding and Decoding", IEEE, Mukherjee et al, 1992, pp. 170–173.

Primary Examiner—Tommy P. Chin
Attorney, Agent, or Firm—Calfee, Halter & Griswold LLP

[57] ABSTRACT

A fully pipelined VLSI circuit structure for implementing the JPEG baseline image compression standard. The circuit structure exploits the principles of pipelining and parallelism to the maximum extent in order to obtain high speed and throughput. The entire is designed to be implemented on a single VLSI chip to yield a clock rate of about 100 MHz which would allow an input rate of 30 frames per second for 1024×1024 color images.

45 Claims, 10 Drawing Sheets

VLSI CIRCUIT STRUCTURE FOR IMPLEMENTING JPEG IMAGE COMPRESSION STANDARD

TECHNICAL FIELD

The present invention relates to VLSI circuit structure for implementing JPEG image compression standard.

BACKGROUND

Data compression is the reduction or elimination of redundancy in data representation in order to achieve savings in storage and communication costs. Data compression techniques can be broadly classified into two categories: lossless and lossy techniques. In lossless techniques, the exact original data can be recovered while in lossy techniques a close approximation of the original data can be obtained. The lossless methods are also called entropy coding techniques since there is no loss of information content during the process of compression. Lossless techniques are used for text compression and image compression in certain environments such as medical imaging where no loss of information is tolerated and typically the compression ratio is around 3:1. Lossy compression techniques are commonly applied in image and audio compression and depending upon the fidelity required much higher compression ratios can be obtained.

Digital images require an enormous amount of space for storage. For example, a color image with a resolution of 1024×1024 picture elements (pixels) with 24 bits per pixel would require 3.15M bytes in uncompressed form. At a video rate of 30 frames per second, this requires a data rate of 94M bytes per second. With the recent advances in video applications such as video teleconferencing, HDTV, home entertainment systems, interactive visualization and multimedia, there is an increasing demand for even higher bandwidth computing and communication systems. Very high speed implementation of efficient image compression techniques will significantly help in meeting that challenge.

In recent years, a working group known as Joint Photographic Expert Group (JPEG) consisting of three international standard organizations, International Telegraph and Telephone Consultative Committee (CCITT), International Organization for Standardization (ISO) and International Electrotechnical Commission (IEC), has defined an international standard for coding and compression of continuous-tone still images. This standard is commonly referred to as the JPEG standard. The primary aim of the JPEG standard is to propose an image compression technique that would be application independent and aid VLSI implementation of data compression.

SUMMARY OF THE PRESENT INVENTION

The Present Invention provides new and useful VLSI circuit structure for implementing JPEG image compression standard on a VLSI chip. The VLSI circuit structure is designed to implement JPEG compression in a manner which achieves fine grain pipelining across the entire circuit, operates at extremely fast timing cycles (eg. at clock cycles of at least 100 MHz).

According to the present invention, the VLSI circuit structure comprises (a) a DCT (discrete cosine transform) module, which receives image pixel data signals and transforms those signals to produce DCT output signals in a form suitable for processing by an entropy encoder module, (b) an entropy encoder module which receives and processes the DCT output signals to produce compressed image data signals, and (c) timing control means for providing timing control signals at predetermined timing intervals to control the processing of the input, and processing of the data signals across the DCT and entropy encoder modules. The DCT output signals are transmitted directly from the DCT module to the entropy encoder module, and the VLSI circuit structure is designed such that during each of the predetermined timing intervals (a) image pixel data signals are being input to the DCT module, (b) data is being processed by the DCT module, (c) DCT output signals are being directed to the entropy encoder module, (d) data signals are being processed by the entropy encoder module, and (e) compressed image output data signals. Thus, during normal operation, data signals are being processed in a manner which is fully pipelined across the entire VLSI circuit structure.

In this application, the notion of transmission of DCT output signals "directly" from the DCT module to the Entropy Encoder module is important. That phase is intended to mean that there is no requirement for buffering the DCT output signals before they are transmitted to the Entropy Encoder module, because of the way the entropy encoder is designed to process those signals. According to the present invention, the entropy encoder module is designed to process DCT output signals in a manner that is fully pipelined with, and at the same clock frequency as, the DCT module. Thus, the DCT output signals can be input directly to the Entropy Encoder, and the VLSI circuit structure signals as well as the computations can be fully pipelined across the entire VLSI circuit structure.

It is also useful to discuss the concept of "fine grain pipelining", which is utilized in the VLSI circuit structure of the present invention to produce maximum speed and throughput in data processing. The concept provides for breaking down the computation as well as the control logic for each module into as many simple, individual segments as possible, with each segment controlling individual data processing functions for each module as simply and finely as possible. This produces not only a fully pipelined VLSI circuit structure, but a VLSI circuit structure which can operate at very fast speeds, i.e., at clock frequencies of at least 100 MHz.

Further features of the present invention will become apparent from the following detailed description and the accompanying drawings and table.

DETAILED DESCRIPTION OF THE PREFERRED EMBODIMENT

As discussed above, the present invention relates to a VLSI circuit structure for implementing JPEG image compression standard on a single VLSI chip. The VLSI circuit structure according to the present invention is specifically described below and illustrated in FIGS. 5–16. However, it is believed useful to first provide some background on the JPEG image compression standard.

I. The JPEG Compression Standard

Figure 1:
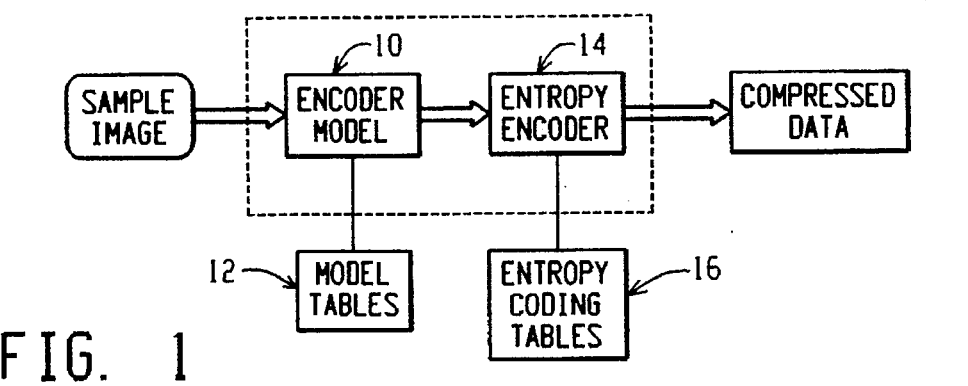
FIG. 1 is a schematic illustration of an encoder model effecting image compression according to the JPEG compression standard.

The basic model for implementing the JPEG compression standard is shown in FIG. 1. The model includes an encoder model 10 and transforms the input image into an abstract representation more suitable for further processing. The encoder model 10 may require parameters stored in some model tables 12 for achieving this transformation. The entropy encoder 14 is a compression procedure which converts the output of the encoder model 10 into a compressed form. Also, the entropy encoder 14 may use tables 16 for storing the entropy codes. Four distinct coding processes were derived based on the above described JPEG model: (i) baseline process, (ii) extended DCT-based process, (iii) lossless process and (iv) hierarchical process. The preferred embodiment of the present invention relates to a VLSI circuit structure which implements the baseline process.

Figure 2:
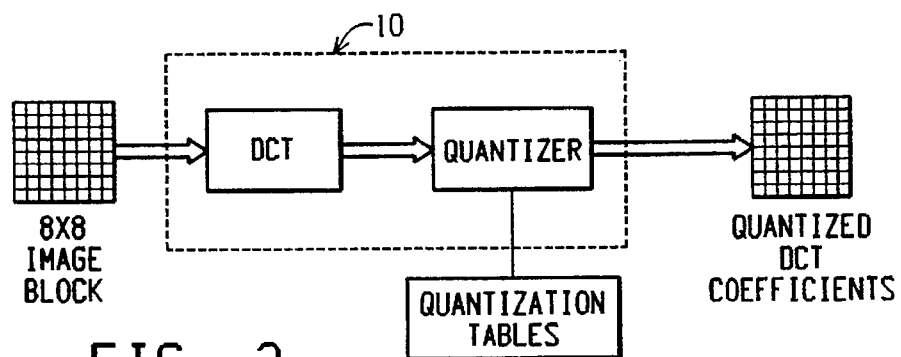
FIG. 2 is a schematic illustration of a baseline encoder model for effecting image compression according to the JPEG compression standard.

The encoder model 10 for the baseline process is shown in FIG. 2. The input image is divided into nonoverlapping blocks of 8×8 pixels and input to the baseline encoder. The pixel values are converted from unsigned integer format to signed integer format and DCT computation is performed on each block. DCT transforms the pixel data into a block of spatial frequencies that are called the DCT coefficients. Since the pixels in the 8×8 neighborhood typically have small variations in gray levels, the output of DCT will result in most of the block energy being stored in the lower spatial frequencies. On the other hand, the higher frequencies will have values equal to or close to zero and hence, can be ignored during encoding without significantly affecting the image quality. The selection of frequencies based on which frequencies are more important and which ones are less important can affect the quality of the final image. JPEG allows for this by letting the user predefine the quantization tables used in the quantization step that follows the DCT computation. The selection of quantization values is important since it affects both the compression efficiency and the reconstructed image quality.

Figure 3:
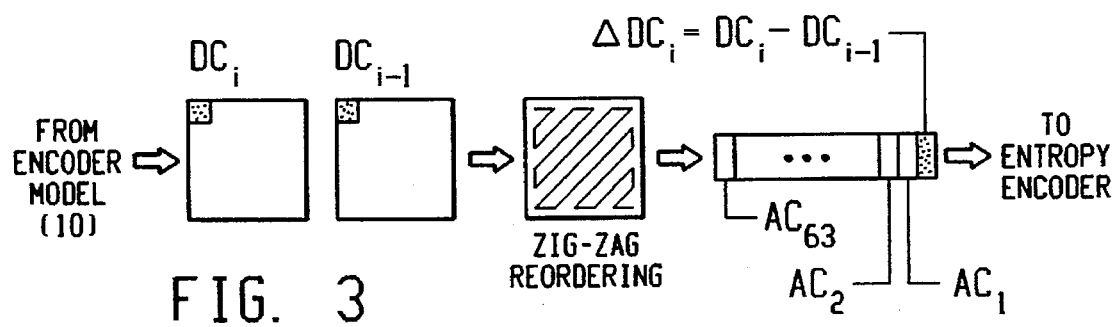
FIG. 3 is a schematic illustration of zig zag reordering of DCT output for the encoder model of FIG. 2.

The block of DCT coefficients output by the encoder model 10 is rearranged into one dimensional data using zig-zag reordering as shown in FIG. 3. The location (0,0) of each block i contains the DC coefficient for the block represented as $DC_i$. This DC coefficient is replaced by the value $\Delta DC_i$ which is the difference between the DC coefficients of block i and block i-1. Since the pixels of adjacent blocks are likely to have similar average energy levels only the difference between the current and previous DC coefficients is used, which is commonly known as differential pulse code modulation (DPCM) technique. It should be noted that the high frequency coefficients that are more likely to be zeroes get grouped at the end of the one dimensional data due to the zig-zag reordering.

Figure 4:
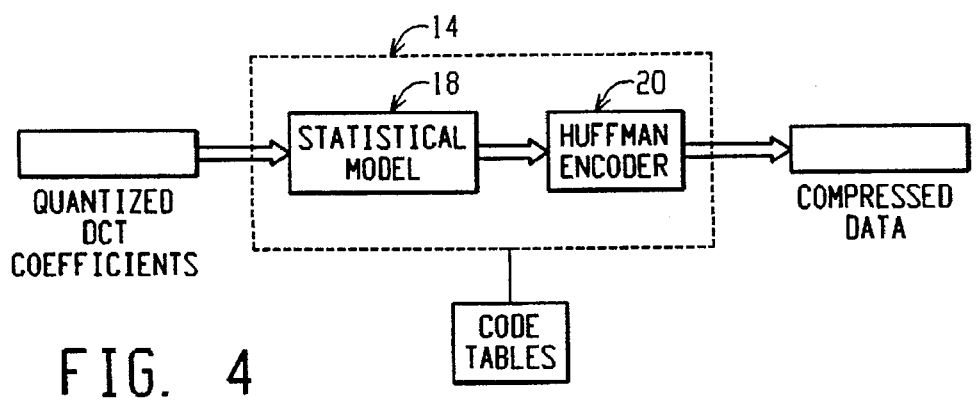
FIG. 4 is a schematic illustration of an entropy encoder for effecting image compression according to the JPEG compression standard.

The entropy encoder 14 details are shown in FIG. 4. The entropy encoder 14 uses variable length encoding based on a statistical model 18 in order to encode the rearranged DCT coefficients. In the entropy encoder 10 the quantized DCT coefficients are converted into a stream of [runlength count, category] pairs. For each pair, there is a corresponding variable length Huffman code which will be used by a Huffman encoder 20 to perform the compression. The Huffman codes are stored in a table. A detailed description of the various steps in the entropy encoder is provided below.

In order to achieve better compression results, very often, input images are transformed to a different color space (or color coordinates) representation before being input to the encoder. Although image compression according to the basic JPEG standard is unaffected by the color, since it processes each color independently, it has been shown that by changing the color space, the compression ratio can be significantly improved. This is due to the perception of the human visual system and the less perfect characteristics of the display devices. One of the most appropriate color spaces for image compression according to the JPEG standard has been shown to be YCbCr, where Y is the luminance component and Cb and Cr are the two crominance components. Since the luminance component carries much more information compared to the crominance components, JPEG allows different tables to be used during compression. For additional information on how color could affect compression the reader is referred to [1–6].

The JPEG baseline compression standard uses DCT and the Huffman entropy coding method for achieving compression. There exist different software and hardware approaches towards the implementation of DCT and Huffman coding. The following discussion provides a brief description of these aspects of DCT and Huffman entropy encoding which are believed to provide some useful background for an understanding of the present invention.

It should be noted that two-dimensional DCT computation can be implemented as a sequence of two one-dimensional DCT's which is commonly referred to as the separability property. This approach is simpler to implement in hardware. It was shown by Haralick [R. M. Haralick, "A storage efficient way to implement the discrete cosine transform", IEEE Trans. Comp., vol. C-25, pp. 764–765, July 1976] that the DCT of N points can be computed using two N-point FFT's (fast fourier transform's) by exploiting the symmetry of the inputs. Later, Tseng and Miller [B. D. Tseng, W. C. Miller, "On Computing Discrete Cosine Transform", IEEE Trans. Comp. Vol. C-27, No. 10, pp. 966–968, 1978] showed that the DCT can be obtained more efficiently by just computing the real part of the first N coefficients of the 2N-point DFT. The computation of 8-point DCT needed for JPEG can be replaced by 16-point DFT (discrete fourier transform) computation followed by scaling. An optimum form for 16-point DFT was developed by Winograd [S. Winograd, "On Computing the Discrete Fouriere Transform", Mathematics of Computation, Vol. 32, No. 141, pp. 175–199, 1978]. Arai, Agui and Nakagima adapted Winograd's solution for 8-point DCT reducing the computation by using the symmetry property [Y. Arai, T. Agui, M. Nakajima, "A Fast DCT-SQ Scheme for Images", Trans. IEICE, Vol. E71, No. 11, pp. 1095–1097, 1988]. The hardware implementation of one-dimensional scaled DCT in applicants' proposed architecture is based on the procedure proposed by Arai et. al. [Y. Arai, T. Agui, M. Nakajima, "A Fast DCT-SQ Scheme for Images", Trans. IEICE, Vol. E71, No. 11, pp. 1095–1097, 1988]. Their computational flow-graph requires 5 multiplications, 29 additions and 16 two's complement operations (referred as multiplications by −1 by Axai et. al. [Y. Arai, T. Agui, M. Nakajima, "A Fast DCT-SQ Scheme for Images", Trans. IEICE, Vol. E71, No. 11, pp. 1095–1097, 1988]). In the next section, applicants describe a modification to this procedure that reduces the number of two's complement operations required from 16 to 12.

A class of VLSI architectures has been proposed for data transformation of tree based codes including Huffman codes [A. Mukherjee, N. Ranganathan, M. Bassiouni, "Efficient VLSI designs for data transformations of tree-based codes", IEEE Trans. Cir. Sys., vol. 38, pp. 306–314, March 1991]. These architectures use the principle of propagation of a token in a reversed binary tree constructed from the original Huffman codes. Several other architectures have been proposed in the literature for implementing static compression techniques [A. Mukherjee, N. Ranganathan, J. W. Flieder and T. Acharya, "MARVLE: A VLSI Chip for Data Compression Using Tree-Based Codes", IEEE Tram. VLSI, vol. 1, pp. 203–214, June 1993; M. T. Sun, "VLSI Architecture and Implementation of High Speed Entropy Decoder", Proc. ISCS, pp. 200–202, 1991]. The codes are fixed prior to the implementation and can not be changed later on which is a disadvantage with the static schemes. A few other VLSI architectures for implementing VLC (variable length coding) using sequential and concurrent VLSI models are described in [M. T. Sun, K. M. Yang, K. H. Tzou, "A High Speed Programmable VLSI for Decoding Variable Length Codes", Proc. SPIE, vol. 1153, August 1989; S. F. Chang, D. G. Messerschmitt, "Designing High Throughput VLC Decoder: Part I-Concurrent VLSI Architectures", IEEE Trans. Cir. and Sys. for Video Tech., June 1992; J. L. Sicre, A. Leger, "Silicon complexity of VLC decoder vs. Q-coder", CCITT February 1989; M. T. Sun, S. M. Lei, "A Parallel VLC Decoder for Advanced Television Applications", Proc 3rd Int. Workshop on HDTV, August 1989]. In the architecture according to the present invention the Huffman codes are stored in RAM modules so that the codes can be changed depending on the application.

Recently, a few special purpose VLSI chips implementing the JPEG baseline compression standard have been built and successfully commercialized. The Intel's i750 video processor [82750PB Pixel Processor databook, INTEL, Santa Clara, October 1993; 82750DB Display Processor databook, INTEL, Santa Clara, September 1993] consists of two chips, the 82 750PB pixel processor and the 82750DB display processor. The pixel processor can be programmed to implement the JPEG compression standard. The C-CUBE CL550 is a single chip processor for JPEG image compression and decompression [CL550 *Users Manual*, C-Cube Microsystems, Milpitas, 1992]. The core of the chip is a compression/decompression unit which consists of the FDCT/IDCT, the quantizer, the runlength encoder/decoder and the Huffman encoder/decoder. The chip can operate at up to 35 MHz. The chip can draw dam at rates upto 17.5 million pixels per second and produce compressed data at a rate of approximately 2 million bytes per second. Since the entropy encoder in the chip operates at a slower speed than the DCT module a FIFO buffer is used between the two modules to avoid overflow during compression. Whenever the amount of data in the buffer reaches a certain level a delay signal is generated which stalls the DCT computation as well as the data input to the system. LSI Logic announced a chipset for JPEG compression that consists of L64735 DCT processor, L64745JPEG coder and L74765 color and raster-block converter [JPEG *Chipset Tecnical Manual*, LSI Logic, Milpitas, January 1993]. The chipset operates at maximum rate of 35 MHz and processes still image data at up to 30 million bytes per second. In July 1993, LSI Logic announced a single chip JPEG coprocessor L64702 designed for graphics and video applications in personal computers, engineering work stations and laser printers [L64702 JPEG *Coprocessor Technical Manual*, LSI Logic, Milpitas, July 1993]. The chip is capable of compressing and decompressing data at rates up to 8.25 million bytes per second with an operating frequency of 33 MHz. Since these are commercial products the technical manuals available in the public domain on these chips do not give much information on the hardware architecture or the implementation details.

The VLSI circuit structure of the present invention is designed to achieve much better speeds by designing a linear static pipeline architecture with no global communication or global control logic. Such an architecture is advantageous in that higher clock speeds can be obtained by decreasing the granularity (fine grain pipelining) of processing in each stage. In other words, the clock period can be reduced by subdividing the data processing functions (and the control logic for each function) into smaller slices or stages.

II. The VLSI Circuit Structure of the Present Invention

The present invention provides a fully pipelined VLSI circuit structure for implementing the JPEG baseline compression standard. The VLSI circuit structure does not require any global communication or global control logic. Thus, the entire VLSI circuit structure can be sliced into thin stages resulting in a small clock period. The architecture for DCT and for category selection and Huffman coding in the entropy encoder are designed to produce to high speed VLSI implementation. With the VLSI circuit structure of the present invention, it is believed possible to obtain data compression rates of 100 million bytes per second or more.

Figure 5:
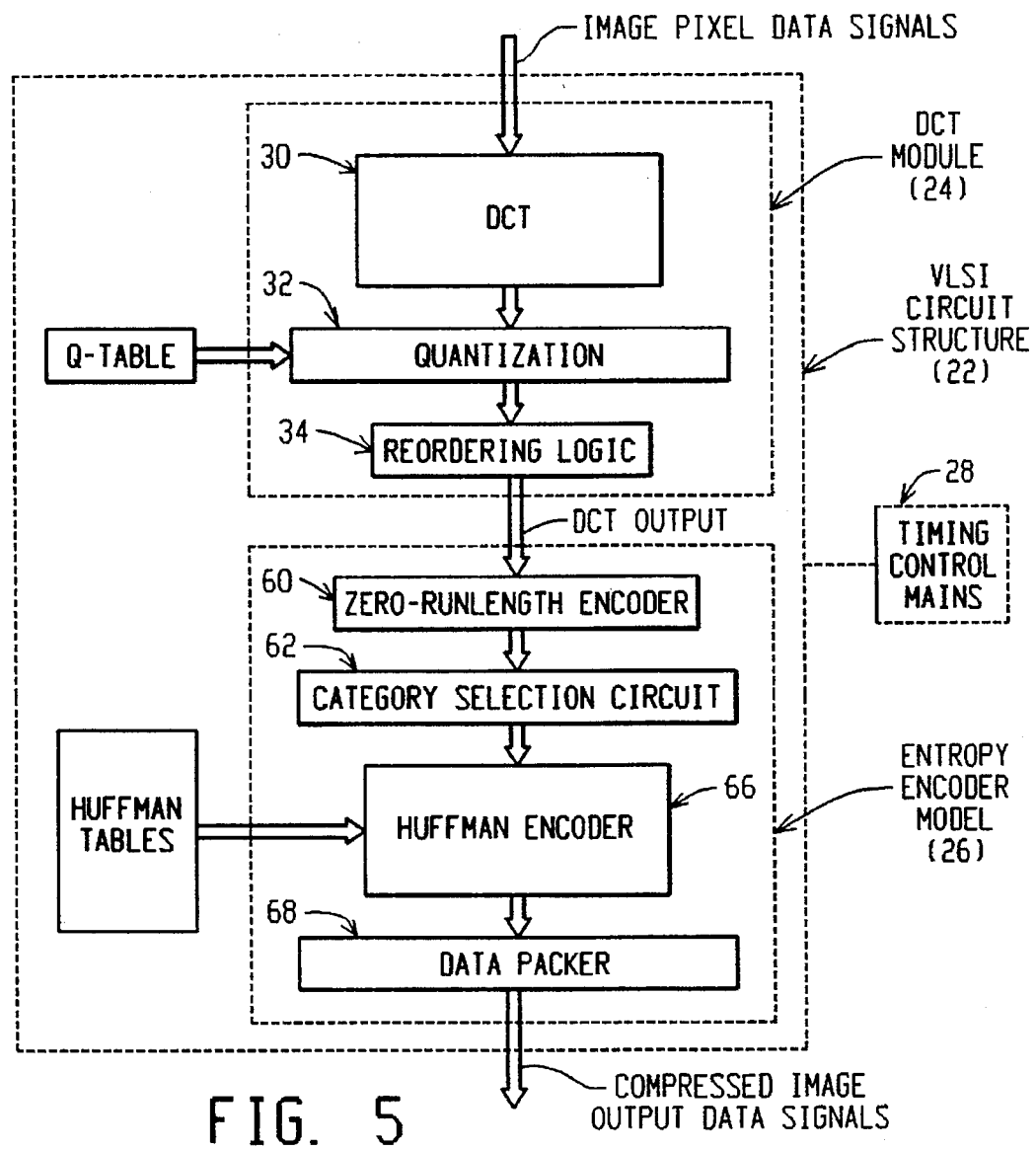
FIG. 5 is a schematic illustration of VLSI circuit structure for effecting JPEG compression according to the present invention.

A VLSI circuit structure 22, according to the present invention, is schematically shown in FIG. 5. The circuit structure 22 is organized as a linear multistage pipeline in order to achieve high throughput. The circuit structure 22 basically comprises a DCT module 24, an entropy encoder module 26, and a timing control means 28 (such as a clock with a predetermined frequency which transmits timing control signals to each components of the circuit, at predetermined timing intervals. The DCT module 24 comprises a DCT section 30, a, quantization section 32 and reordering logic section 34. The entropy encoder module 26 shown more fully in FIG. 10 comprises a zero-runlength encoder 60, category selection circuit 62, strip logic 64 (see FIG. 10), Huffman encoder 66 and data packer 68.

The image to be compressed is input to the architecture at the rate of one pixel per clock cycle. The input data is processed by the various modules in a linear fashion where each module itself is organized internally as a multistage linear pipe. The compressed data is output by the system at a variable rate depending on the amount of compression achieved. The design of each module is described in detail below.

1. DCT Module

The DCT module 24: (i) DCT section 30, (ii) quantization section 32 and (iii) zig-zag reordering section 34.

Figure 6:
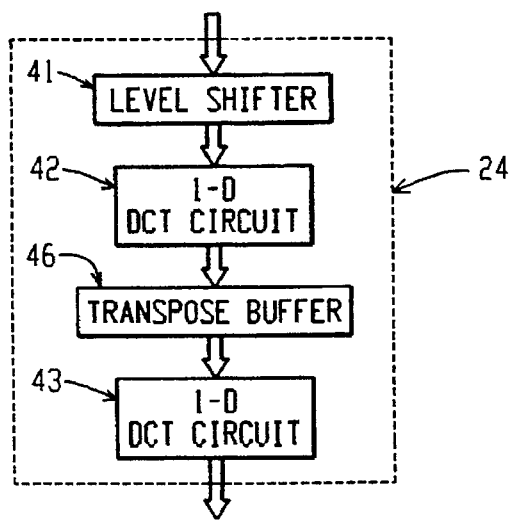
FIG. 6 is a schematic illustration of a DCT module for the VLSI circuit structure of FIG. 5.

The DCT section 24 is shown schematically in FIG. 6. It comprises a level shifter 41, two DCT circuits 42, 43 and a transpose buffer 46. As discussed above, the scaled two-dimensional DCT computation can be separated into two one-dimensional DCT operations and each one-dimensional DCT can be implemented by using modified DFT. The first DCT computation is performed row-wise and the second DCT computation is performed column-wise.

A previous proposed DCT computation technique [Y. Arai, T. Agui, M. Nakajima, "A Fast DCT-SQ Scheme for Images", Trans. IEICE, Vol. E71, No. 11, pp. 1095–1097, 1988] requires 5 multiplications, 29 additions and 16 two's complement additions. The computation technique is modified according to the present invention, in order to reduce the number of two's complement operations from 16 to 12, besides the same number of multiplications and additions. The modified computation technique is stated below:

Step 1:
$b_0=a_0+a_7$; $b_1=a_1+a_6$; $b_2=a_3-a_4$; $b_3=a_1-a_6$; $b_4=a_2+a_5$; $b_5=a_3+a_4$; $b_6=a_2-a_5$; $b_7=a_0-a_7$;

Step 2:
$c_0=b_0+b_5$; $c_1=b_1-b_4$; $c_2=b_2+b_6$; $c_3=b_1+b_4$; $C_4=b_0-b_5$; $c_5=b_3+b_7$; $c_6=b_3+b_6$; $c_7=b_7$;

Step 3:
$d_0=c_0+c_3$; $d_1=c_0-c_3$; $d_2=c_2$; $d_3=c_1+c_4$; $d_4=c_2-c_5$; $d_5=c_4$; $d_6=c_5$; $d_7=c_6$; $d_8=c_7$;

Step 4:
$e_0=d_0$; $e_1=d_1$; $e_2=m3*d_2$; $e_3=m1*d_7$; $e_4=m4*d_6$; $e_5=d_5$; $e_6=m1*d_3$; $e_7=m2*d_4$; $e_8=d_8$;

Step 5:
$f_0=e_0$; $f_1=e_1$; $f_2=e_5+e_6$; $f_3=e_5-e_6$; $f_4=e_3+e_8$; $f_5=e_8-e_3$; $f_6=e_2+e_7$; $f_7=e_4+e_7$;

Step 6:
$S_0=f_0$; $S_1=f_4+f_7$; $S_2=f_2$; $S_3=f_5-f_6$; $S_4=f_1$; $S_5=f_5+f_6$; $S_6=f_3$; $S_7=f_4-f_7$;

where:

$a_i$ input elements ($0 \leq i \leq 7$)

$S_i$ scaled DFT coefficients ($0 \leq i \leq 7$)

Figure 7A:
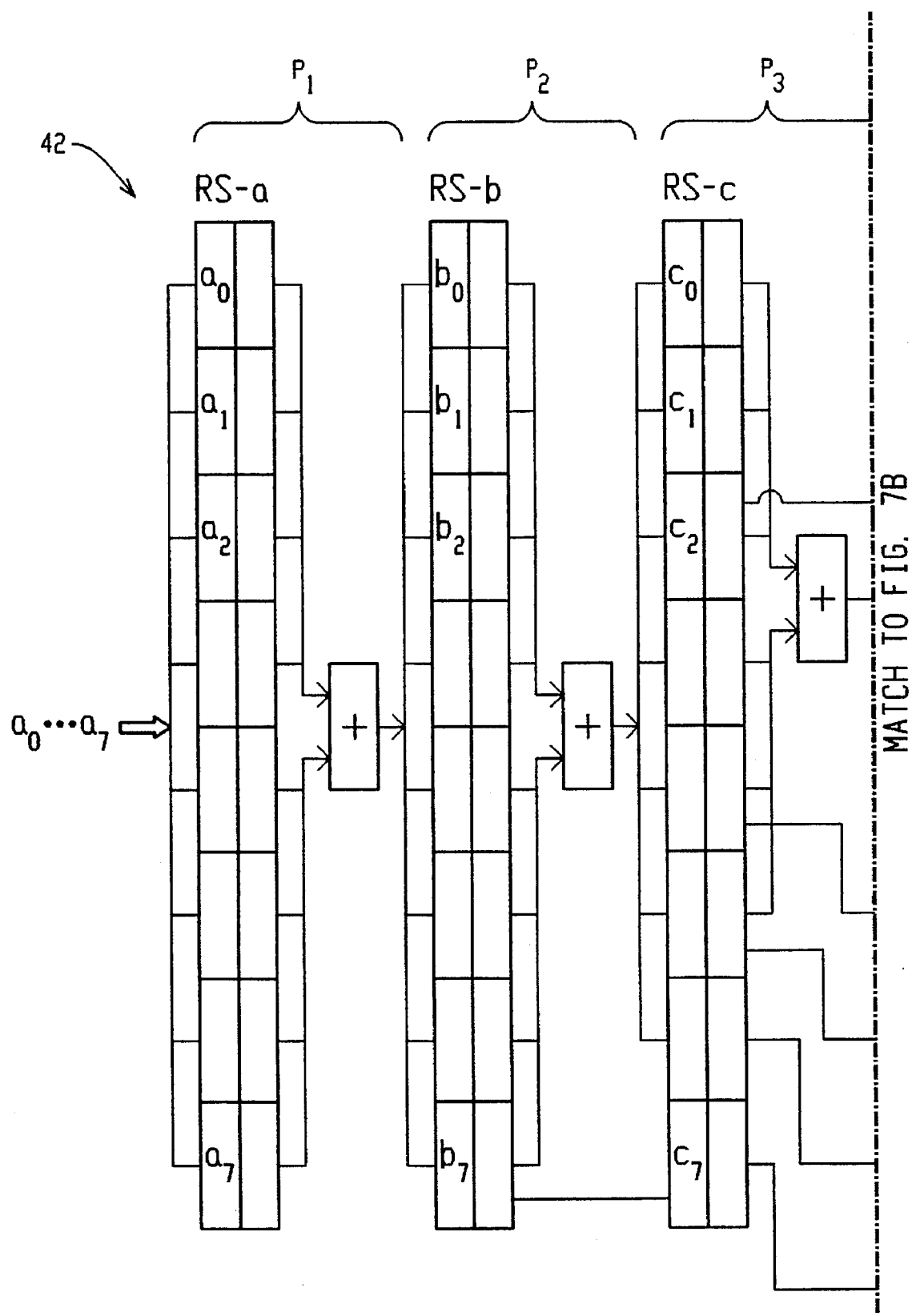
FIGS. 7A and 7B is a schematic illustration of a one dimensional DCT circuit, for the DCT module of FIG. 6.
Figure 7B:
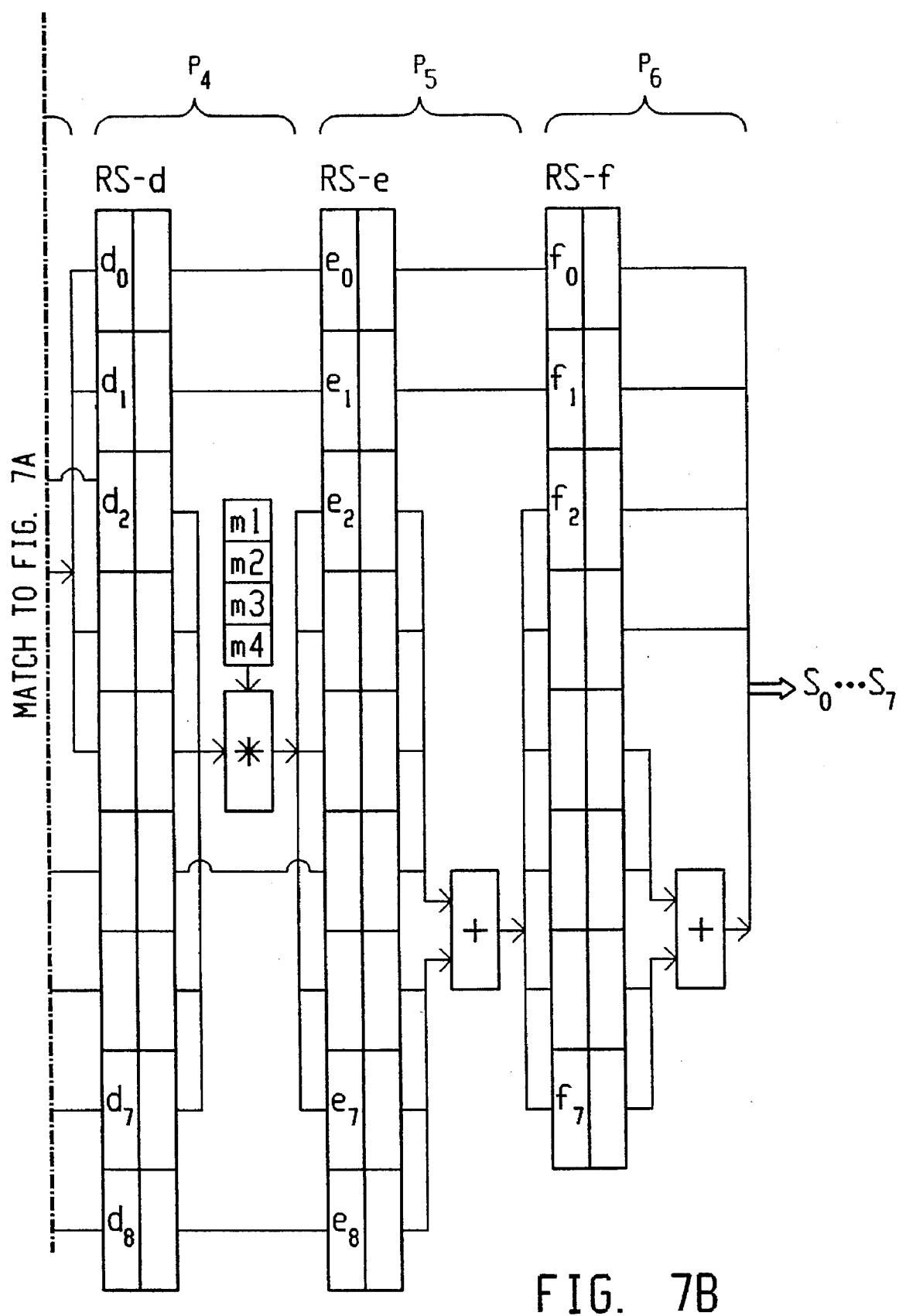

$m_i$ fixed multipliers:
- m1=cos (4π/16);
- m2=cos (6π/16);
- m3=cos (2π/16)−cos (6π/16);
- m4=cos (2π/16)+cos (6π/16);

The one dimensional DCT circuit structure (e.g. 42) for performing DCT computation according to the applicants' concept is shown in FIGS. 7A and 7B. The circuit consists of six partitions $P_1$–$P_6$ as shown in the figure. Each partition contains a register set (RS) and an arithmetic unit with some associated control logic (e.g. a counter, not shown). Each register set consists of two columns of eight registers each except for the columns RS-d and RS-e which have nine registers per column. The circuit accepts image input data signals at the rate of one pixel per clock cycle and the entire processing is performed as a linear pipe. The applicants' DCT computation techniques described above is embodied in the circuit such that each step in the computation technique corresponds to a partition in the circuit structure. When the left column of register set RS-a is filled with eight data elements, the entire column is copied onto the corresponding registers in the right column. As the adder logic performs the computations as in step 1 of the applicants' DCT computation technique, the left column keeps receiving new input data. A similar process occurs in each of the partitions simultaneously. It takes eight clock cycles to complete all the computations in step 1 which is the same number of cycles needed for filling up the left column. The adders are single stage units while the 16-bit multiplier is a six stage Wallace tree multiplier.

Figure 8:
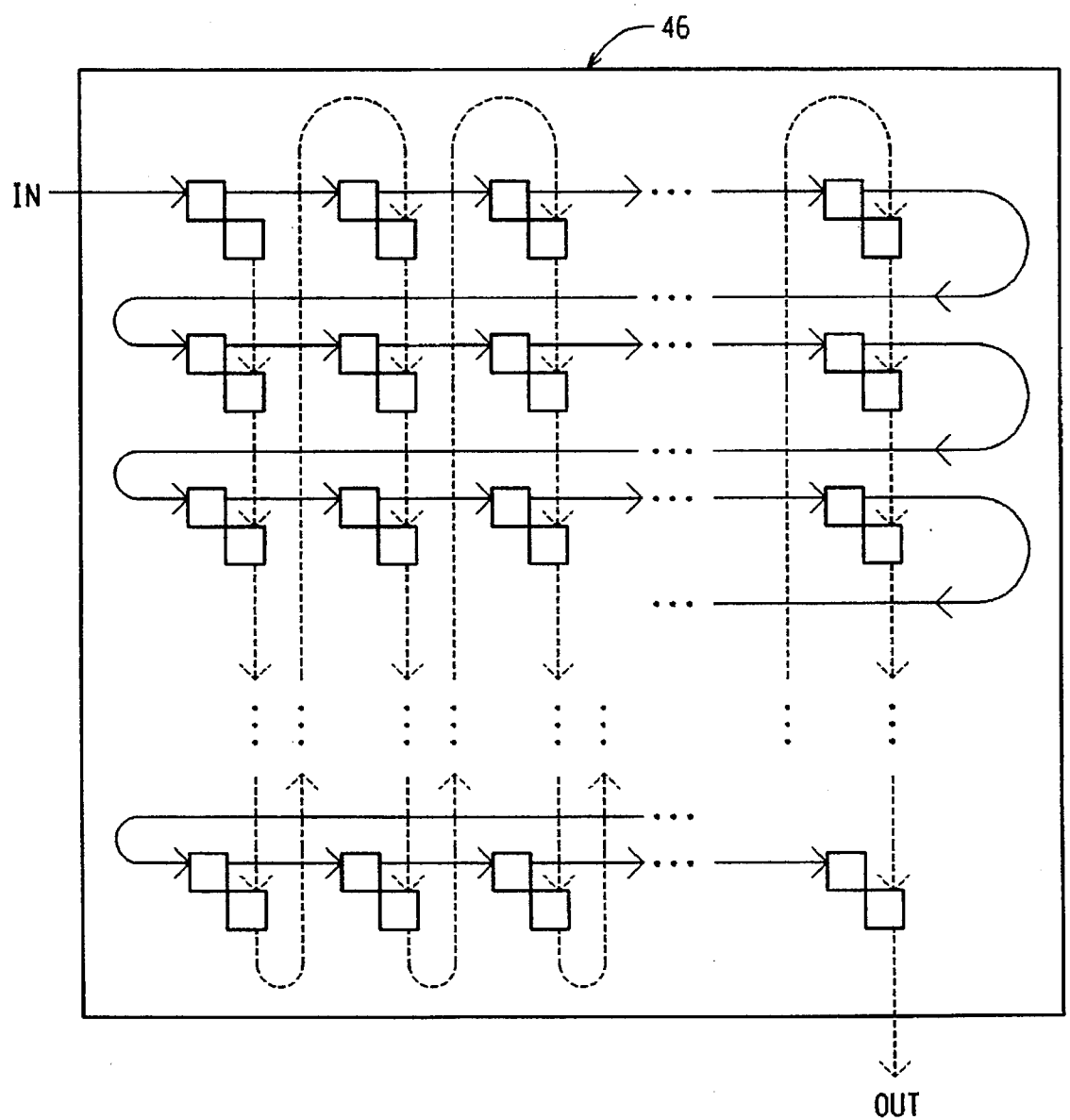
FIG. 8 is a schematic illustration of a transpose buffer for the DCT module of FIG. 6.

The transpose buffer 46 is shown in FIG. 8. The buffer consists of an 8×8 array of register pairs organized as shown in figure. The data is input to the transpose buffer 46 in row-wise fashion until all the 64 registers are loaded. The data in those registers are copied in parallel onto the corresponding adjacent registers which are connected in column-wise fashion. While the data is being read out from the column registers, the row registers will keep receiving further data from the one dimensional DCT circuit 42. Thus, the output of row-wise DCT computation is transposed for column-wise DCT computation by the one dimensional DCT circuit 43. The transpose buffer 46 has a latency of 64 clock cycles.

Figure 9:
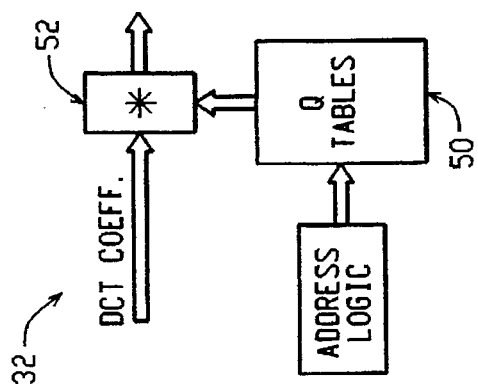
FIG. 9 is a schematic illustration of a quantization section, for the DCT module of FIG. 6.
Figure 11:
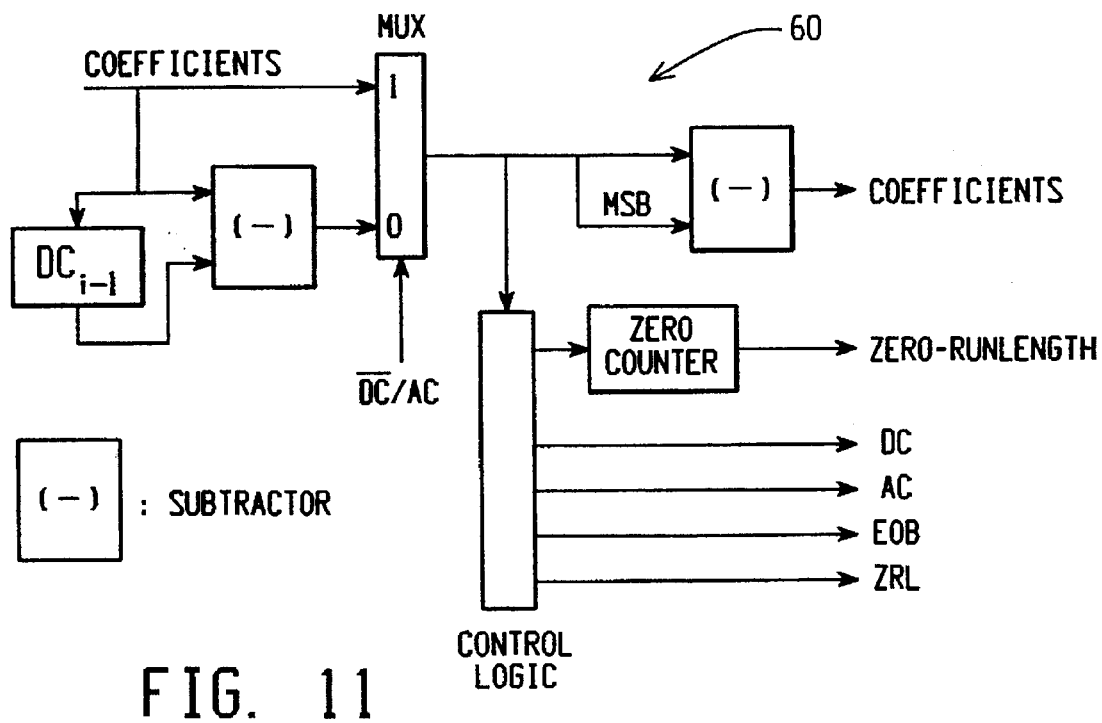
FIG. 11 is a schematic illustration of the zero runlength coder for the entropy encoder module of FIG. 10.

The quantization section 32 is shown in FIG. 9. It consists of a RAM 50 to store the quantization table and a 16-bit multiplier 52. The output of DCT needs to be scaled which is done by multiplying each coefficient with the predefined scaling factor. The quantization step for JPEG compression standard involves multiplying the output of DCT with a set of predefined values from a quantization table. Since both the above steps involve multiplication, according to the applicants' concept the two steps are merged into a single multiplication step by suitably combining the scaling and the quantization parameters. The latency of the quantization section 32 is six clock cycles which equals the number of stages in the multiplier.

Each block of data that is output by the quantization section 32 needs to be reordered in a zig-zag fashion before being forwarded to the entropy encoder. In the DCT module 24, this reordering is achieved by a reordering logic section 34 which uses an 8×8 array of register pairs organized in a fashion similar to the transpose buffer 46.

2. Entropy Encoder Module

Figure 10:
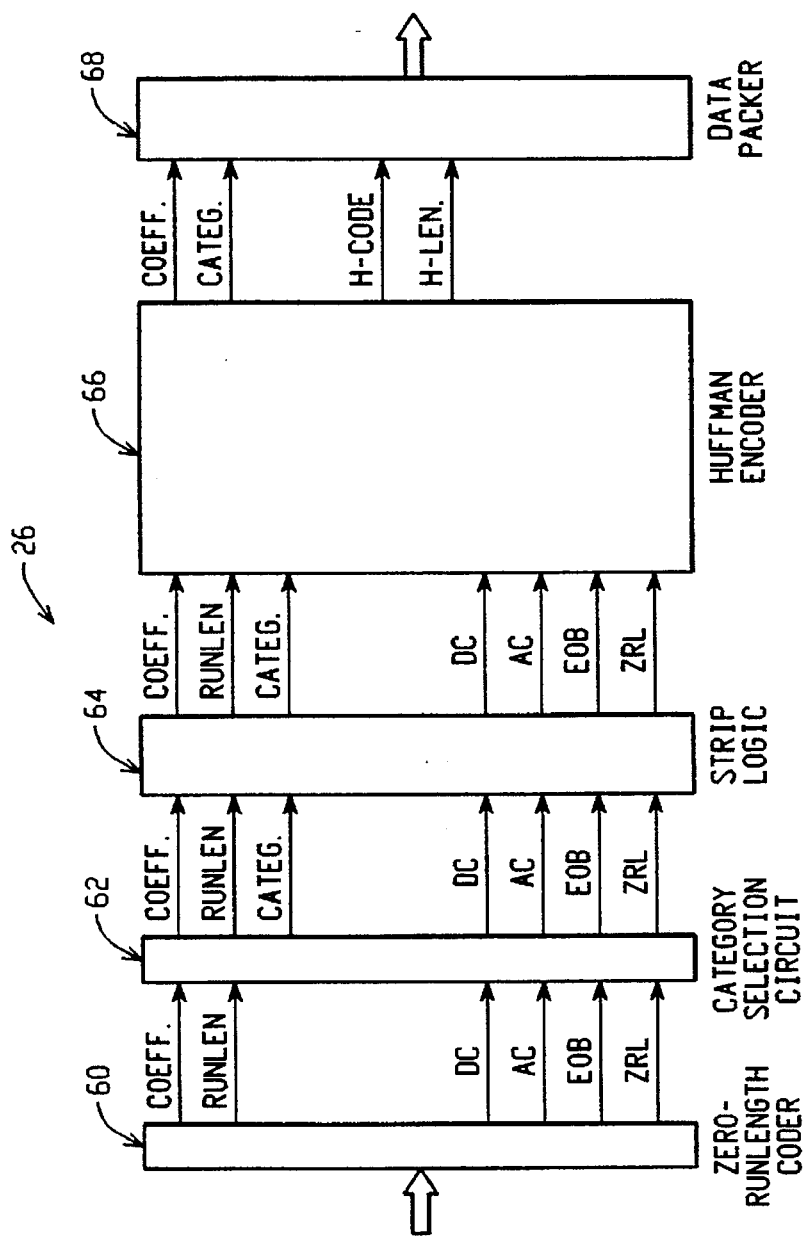
FIG. 10 is a schematic illustration of the architecture of the entropy encoder module for the VLSI circuit structure of FIG. 5.

The function of the entropy encoder module 26 is to code the quantized coefficients from the DCT module 24, using variable length encoding. The structure for the entropy encoder module 26 is schematically shown in FIG. 10. As can be seen in the figure, the entropy encoder module 26 comprises (i) zero-runlength coder 60 (ii) category selection circuit 62 (iii) strip logic 64 (iv) Huffman encoder 66 and (v) data packer 68. Each block of quantized pixel data consists of one DC coefficient followed by 63 AC coefficients. The manner in which the entropy encoder performs that function is discussed below.

The first step is to calculate ΔDC which is the difference between the current DC coefficient and the DC coefficient of the previous block. Also, the JPEG compression standard requires that the DC/AC coefficients are decremented by one if the sign of the coefficient is negative. The next step is to extract the zero-runlength count from the stream of the AC coefficients within that block. The block data is thus converted into a stream of AC coefficients with an associated count value indicating the number of zeros preceding that coefficient. The runlength count is represented as a 4-bit field. When the runlength is greater than 16, two special symbols, ZRL and EOB are used to code the data depending on certain conditions. A zero-runlength symbol ZRL (represented in JPEG as F/0) is inserted within the data whenever a runlength of 16 zeros is encountered. The end-of-block symbol EOB (represented in JPEG as 0/0) is inserted whenever it is detected that the rest of the AC coefficients until the end of the block are zeros. A 4-bit status field is generated corresponding to each coefficient which indicates if the data being output is a DC or AC coefficient, ZRL or EOB symbol. The above steps are performed within the zero-runlength coder 60 (see FIG. 11).

The zero-runlength coder section 60 consists of three stages and thus a latency of three cycles. The first stage consists of logic for computing ΔDC while the second stage derives the runlength count and the third stage is used for decrementing negative coefficients.

Within the category selection circuit 62 (FIGS. 12, 13), each DC and AC coefficient is associated with a corresponding category depending on the magnitude of the coefficient. The definition of categories as defined by the JPEG standard is shown in Table 1. Each element in the stream of data coming out of the category selection unit consists of coefficients, the corresponding category, the runlength count and the four-bit status. It should be noted that the data stream still contains all 64 coefficients including the streaks of zero coefficients which have been encoded as zero runlength counts. Also if an EOB symbol follows one or more ZRL symbols within the data stream the ZRL symbols are redundant and must be stripped off the data stream. The above functions are performed within the strip logic circuit portion 64 (see also FIG. 14).

During the next step shown by the Huffman encoder 66 (see FIG. 15), each data element consisting of <AC/DC coefficient, runlength count, category, status> output by the strip logic circuit portion 64 is converted into a corresponding element: <AC/DC coefficient, category, Huffman code, Huffman code length>. The Huffman code is selected based on the runlength count, category and status fields. The set of Huffman codes are prestored in a table and can be changed depending on the application. The category and the Huffman code length fields are used in the data packer unit to pack the variable length compressed data (comprised of DC/AC coefficient and the Huffman code) into a stream of fixed length compressed data units to be output by the compression chip.

The design of category selection circuit 12 is based on a concept which is described here. The category selection is defined as a table in the JPEG compression standard document. A straightforward implementation of category selection would require storing the ranges in memory and comparing the input data with those prestored values which requires complex address decoding and control logic. Described below are some mathematical results which lead to very efficient hardware implementation for category selection.

Definition 1.

Let $x \in X$, $y \in Y$ and $z \in \{0,1\}$ where $X$ and $Y$ are subsets of the set of integers $N$. For convenience, we define a 1:2 mapping function $\phi$ as follows:

$$\phi(y,z) = 2y+z \quad (1)$$

Using this function, we can generate the set $X$ as $$X = \{x \in N | x = \phi(y,z)\} \forall y \in Y \subset N, \forall z \in \{0,1\} \quad (2)$$

It is obvious that by using function $\phi$, we generate the set $X$ with twice the number of elements of the set $Y$ and therefore, in further text, we will refer to this function as the expansion function.

Theorem 1.

Let $C_i$ be a set of integers defined as $$C_i = \{x \in N | ((-1 \cdot 2^i) \leq x \leq (-1 \cdot 2^{i-1}-1)) \lor (2^{i-1} \leq x \leq 2^i-1)\}, i \in N, i \geq 1 \quad (3)$$

Given set $C_i$, the set $C_{i+1}$ can be expressed as $$C_{i+1} = \{x \in N | x = \phi(y,z)\} \forall y \in C_i, \forall z \in \{0,1\} \quad (4)$$

Proof:

Let us redefine the function $\phi(y,z)$ into a set of two subfunctions $\phi_0$ and $\phi_1$ as follows:

$$\phi_0(y) = 2 \cdot y \text{ and } \phi_1(y) = 2 \cdot y + 1.$$

Using the above two functions, we can generate the following two sets $X_0$ and $X_1$:

$$X_0 = \{x \in N | x = \phi_0(y)\} \text{ and } X_1 = \{x \in N | x = \phi_1(y)\} \forall y \in Y.$$

It should be noted that the set $X_0$ consists of only even numbers while the set $X_1$ consists of only odd numbers. The set $X$ generated by function $\phi$ as described in Eqn 0.2. is actually a union of sets $X_0$ and $X_1$:

$$X = X_0 \cup X_1.$$

By applying $\phi_0$ and $\phi_1$ to $Y = C_i = \{-1 \cdot 2^i, \ldots, -1 \cdot 2^{i-1}-1, 2^{i-1}, \ldots, 2^i-1\}$ we get the following subsets:

$$X_0 = \{-1 \cdot 2^{i+1}, -1 \cdot 2^{i+1}+2, -1 \cdot 2^{i+1}+4, \ldots, -1 \cdot 2^i-2, 2^i, 2^i+2, 2^i+4, \ldots, 2^{i+1}-2\}$$

and $$X_1 = \{-1 \cdot 2^{i+1}+1, -1 \cdot 2^{i+1}+3, -1 \cdot 2^{i+1}+5, \ldots, -1 \cdot 2^i-1, 2^i+1, 2^i+3, 2^i+5, \ldots, 2^{i+1}-1\}$$

and their union is $X = \{-1 \cdot 2^{i+1}, \ldots, -1 \cdot 2^i-1, 2^i, \ldots, 2^{i+1}-1\}$ which is actually $C_{i+1}$ is a special set consisting of only one element $C_0$.

Lemma 1.

Given the initial set $C_1$, we can generate all sets $C_i$ by successively applying the expansion function $\phi$.

The proof is omitted since it follows directly from Theorem 1.

Definition 2.

Let $x$ be an integer represented in two's complement form with n bits as $x_{n-1} x_{n-2} \ldots x_0$. A function $\rho(x,i)$ is defined as follows $$\rho(x,i) = \begin{cases} 1 & \text{if } x_{n-1} = x_{i-1} \\ 0 & \text{if } x_{n-1} \neq x_{i-1} \end{cases} \quad (5)$$

Theorem 2.

Let $x$ be an integer represented in two's complement form with n bits and let $x$ belong to one of the sets $C_i, C_{i-1}, \ldots, C_1$ (defined in Theorem 1) or belong to $C_0$, where $C_0 = \{0\}$. Using function $\rho$, the membership of element $x$ can be determined as follows:

$$\rho(x,i) = 0 \rightarrow x \in C_i$$

$$\rho(x,i) = 1 \rightarrow x \in C_{i-1} \text{ or } C_{i-2} \ldots \text{ or } C_0$$

Proof:

From Theorem 1, it can be seen that all sets $C_i$ can be obtained from the initial set $C_1 = \{-2,1\}$. If we represent the elements $\{-2,1\}$ in n-bit two's complement binary format, we have: $-2 = (11 \ldots 110)_2$ and $1 = (00 \ldots 001)_2$. In order to obtain the elements of the other sets using the expansion function ø, we multiply these elements by 2 (left shift) and add 0 or 1 to the shifted value. By doing this, we simply move the 'leading' binary digit (zero in the case of −2 and one in the case of 1) one position to the left. Thus applying the expansion function ø repeatedly (i−1) times, the leading zero in case of negative elements or the leading one in case of positive elements will be shifted left to the i-th position. Hence, $$x \in C_i \rightarrow x_{i-1} = \begin{cases} 0 & \text{if } x < 0 \\ 1 & \text{if } x > 0 \end{cases}$$

Now, since we can distinguish between positive and negative elements in two's complement representation based on the most significant bit $x_{n-1}$ and since x belongs to set $C_j$ where $j \leq i$, it means that x belongs to the set $C_i$ if the bits $x_{n-1}$ and $x_{i-1}$ are different. If the bits $x_{n-1}$ and $x_{1-1}$ are the same, then x belongs to $C_j$ where $j < i$.

Figure 12:
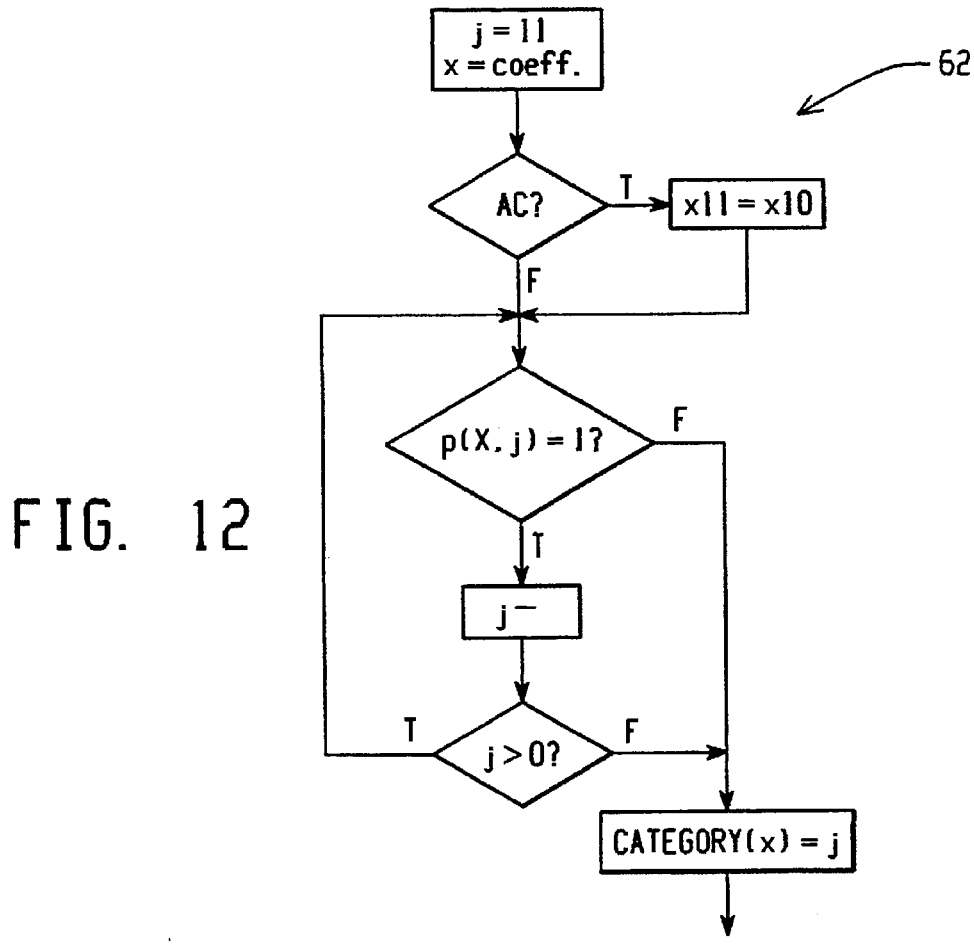
FIG. 12 is a schematic illustration of the category selection function for the entropy encoder module of FIG. 10.
Figure 13:
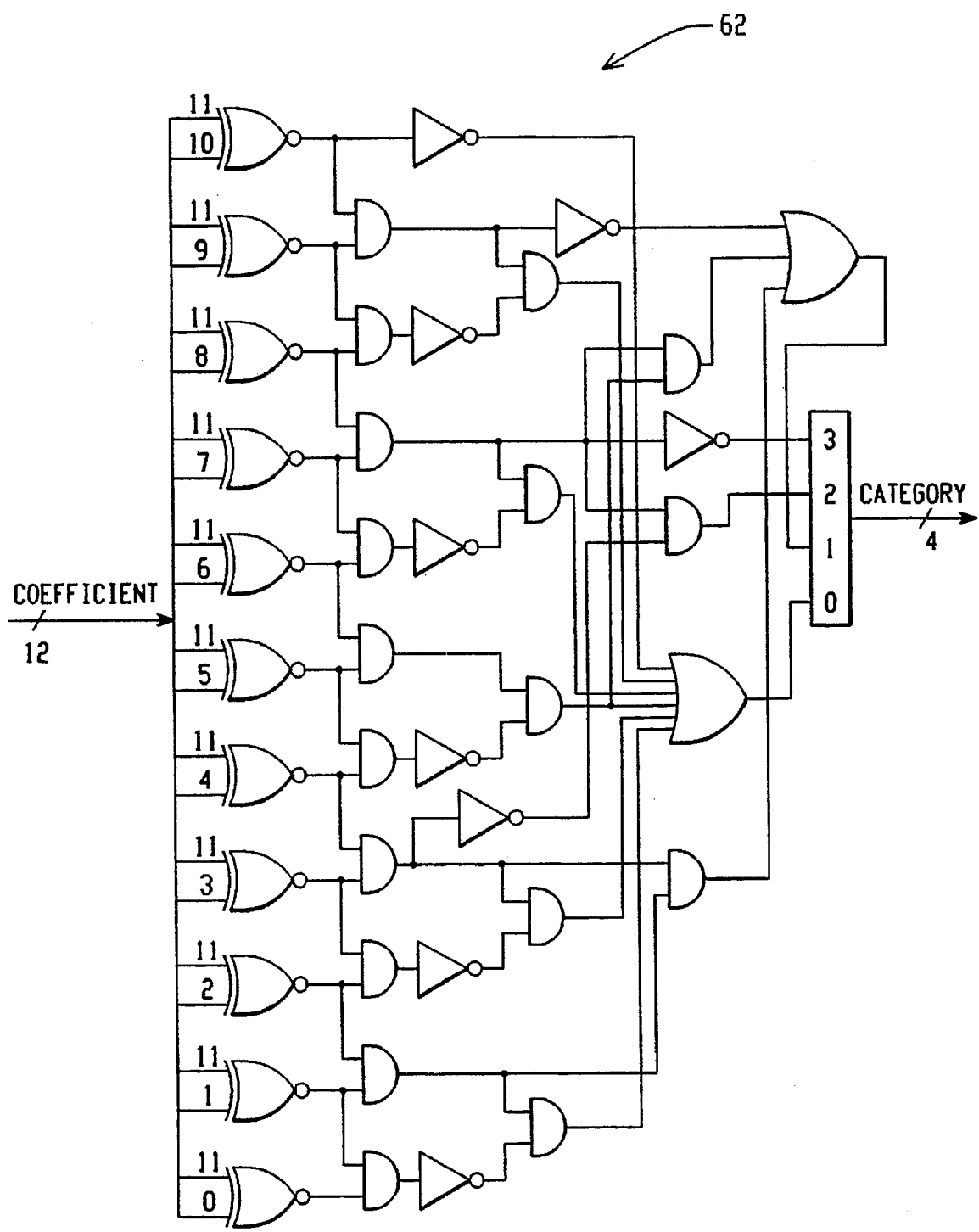
FIG. 13 is a schematic illustration of a category selection circuit for the entropy encoder module of FIG. 10.

Now, the membership of x in one of the sets $C_i, C_{i-1}, \ldots, C_0$ can be determined using the following algorithm:
  j=i;
  While (ρ(x,j) && j>0) j--;
  $x \in C_j$ The above algorithm is an extension of the result given in Theorem 2. By repeatedly applying the test condition the exact membership of x can be derived. The simple but important results of theorems 1 and 2 are used in deriving an efficient hardware implementation for category selection. The set $C_i$ here represents the set of coefficients in the i-th category as defined in JPEG standard. However, it should be noted that the negative coefficients must be decremented by one before applying the test condition as per the JPEG standard. A flowchart of the category selection concept is shown in FIG. 12 and its implementation as a single stage circuit is shown in FIG. 13.

Figure 14:
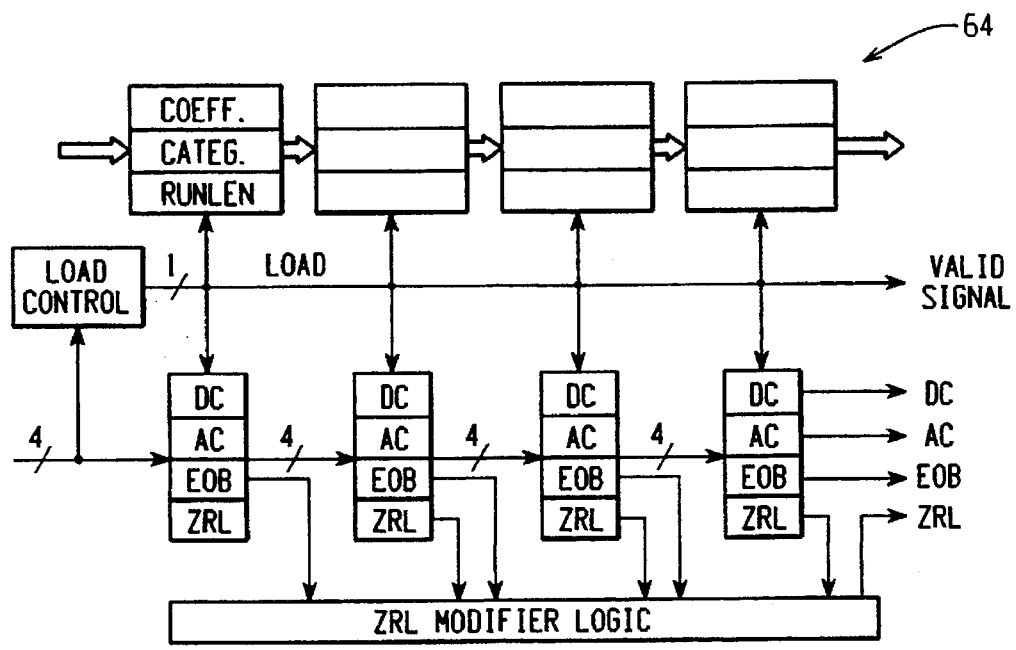
FIG. 14 is a schematic illustration of strip logic for the entropy encoder module of FIG. 10.

The strip logic 64 shown in FIG. 14 consists of four stages. Each stage has three registers to hold the coefficient, runlength count and category fields corresponding to a data element output by the category selection circuit and a set of one-bit registers to hold the corresponding status. The status bits are decoded and used to strip the zero-valued coefficients and also to strip off the ZRL symbols that precede an EOB symbol. It should be noted that there could be a maximum of three ZRL symbols preceding an EOB symbol. The strip logic acts as a four stage buffer through which the compressed data elements after the removal of zero coefficients travel before being forwarded to the Huffman encoder. The valid bit signal is set to high whenever valid data is being output by the strip logic for Huffman encoding. It should be noted that the ZRL bit needs to be reset whenever a ZRL symbol has been deleted from the data stream.

Figure 15:
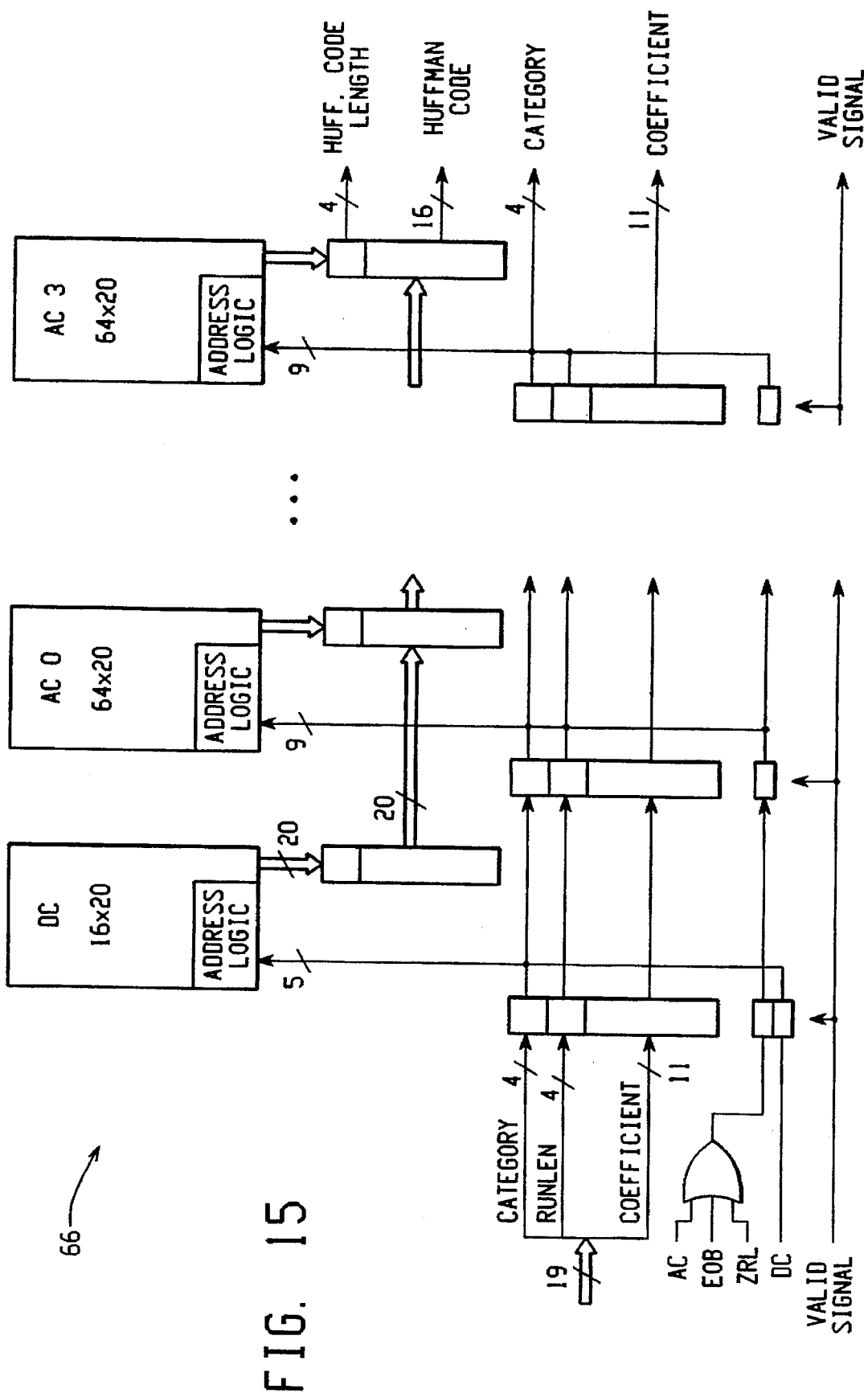
FIG. 15 is a schematic illustration of a Huffman encoder for the entropy encoder module of FIG. 10.

The Huffman encoder module consists of Huffman 64 (FIG. 15) code tables stored in random access memory modules and logic for replacing the category, runlength count pairs with the corresponding Huffman codes. Although the size of the DC coefficient code table is small, the code table storage for AC coefficients is relatively large. In order to keep the clock period small the memory for the code tables is organized as a set of five RAM modules arranged in a linear pipeline fashion. The idea is to reduce the access time by keeping the memory size small. The table is accessed by using the runlength, category pair for addressing. The input data passes through each of the five stages and depending on the address the corresponding Huffman code and the code length are output. The hardware organization is shown in FIG. 15 which is self explanatory.

Figure 16:
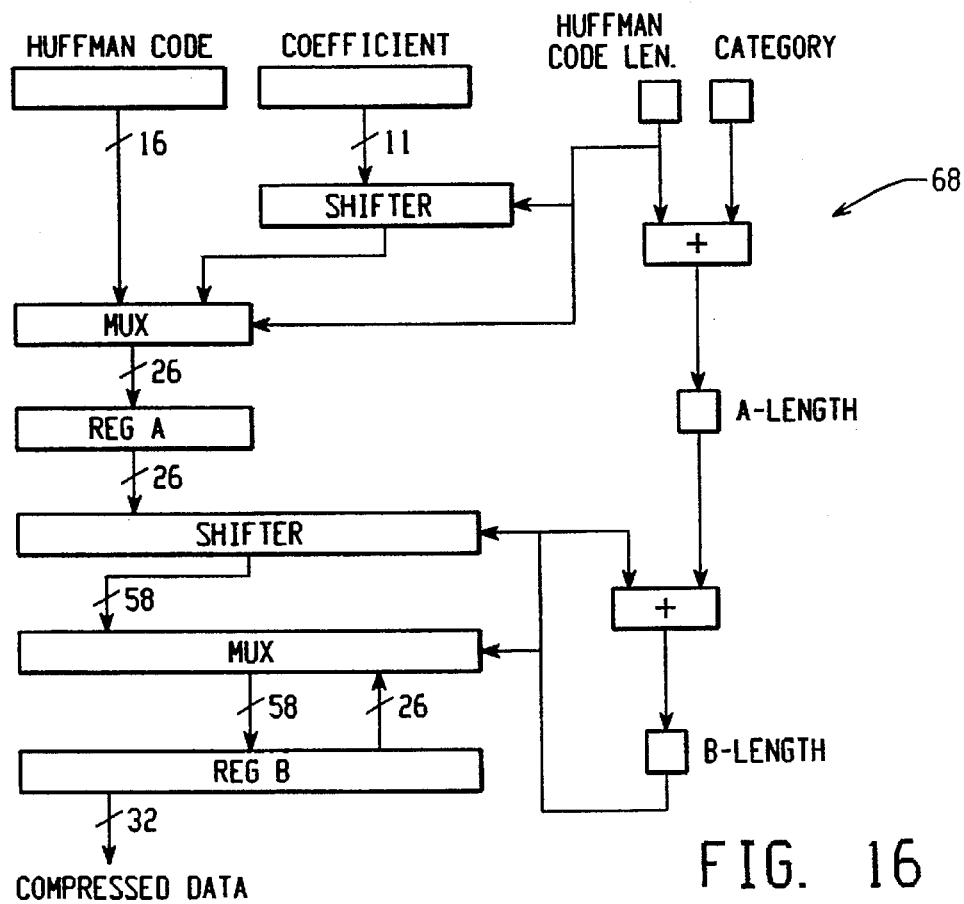
FIG. 16 is a schematic illustration of data packer for the entropy encoder module of FIG. 10, and Table 1 shows Dc and AC coefficients and corresponding categories, according to the JPEG compression standard.

The data packer 68, shown more fully in FIG. 16 is used to convert variable length compressed data into fixed length compressed data stream. The logic consists of registers A and B, two left-shift units, two multiplexers and control logic which includes two registers A-length and B-length. The data packer works as follows. The Huffman code is first loaded into register A left justified. Depending on the length of the Huffman code, the coefficient is loaded through a multiplexer into register A, bit-aligned with the Huffman code. It should be noted that the total length of the Huffman code and the coefficient cannot exceed 26 bits and the length information is loaded into the A-length register. The data in register A is loaded through a left shifter unit and a multiplexer into register B. The loading of new data into register B is controlled using the shifter and the multiplexer which are in turn controlled by the values in the A-length and the B-length registers. Whenever register B has more than 32 bits of information which is indicated by the B-length register value a 32-bit compressed data is output. A similar logic can be used for byte-stuffing required by the JPEG standard.

Thus, as seen from the foregoing the present invention provides new and useful VLSI circuit structure for implementing JPEG image compression on a VLSI chip. The VLSI circuit structure is designed to implement JPEG compression in a manner which provides fine grain pipelining across the entire circuit, and operates at extremely fast timing intervals (e.g. at clock cycles at least 100 MHz).

We claim:

1. A VLSI circuit structure for implementing image compression on a VLSI chip, comprising a DCT module, an entropy encoder module, input means for directing image pixel data signals to said DCT module, said DCT module designed to transform said image pixel data signals to produce DCT output signals in a form suitable for processing by said entropy encoder module and to transmit said DCT output signals directly to said entropy encoder module, said DCT module including zig-zag reordering logic that does not act as a buffer for synchronizing operations between said DCT module and said entropy encode module, said entropy encoder module designed to process said DCT output signals to produce compressed image output data signals, and timing means for providing timing control signals at predetermined timing intervals to control the processing of said image pixel data signals; said VLSI circuit structure being designed such that during each of said predetermined timing intervals said image pixel data signals are being directed to the DCT module, said DCT output signals are being transmitted directly from said DCT module to said entropy encoder module and said compressed image output data signals are being generated by said entropy encoder module, so that during normal operation, said image pixel data signals are being processed in a manner which is fully pipelined across the entire VLSI circuit structure.

2. A VLSI circuit structure as defined in claim 1, wherein said predetermined timing intervals are clock cycles at a frequency of at least 100 MHz.

3. A VLSI circuit structure as defined in claim 1, wherein said DCT module comprises a DCT section for receiving said image pixel data signals input thereto and for performing DCT computations therewith to produce DCT data signals, a quantization section for scaling the DCT data signals and a reordering logic section for reordering the DCT data signals and to produce the DCT output signals.

4. A VLSI circuit structure as defined in claim 3, wherein said DCT section further includes a level shifter for receiving said image pixel data input signals, and a pair of one-dimensional DCT circuits with a transpose buffer between them, to effect DCT computations or data movements related to said DCT computations during each of said timing intervals.

5. A VLSI circuit structure as defined in claim 4, wherein each of said one-dimensional DCT circuits comprises a plurality of partitions, each of said partitions includes a register set, an arithmetic unit and associated control logic; each register set comprising two columns of registers; one column for receiving signals being input to the register set during each of said predetermined timing intervals and the other column for receiving signals from the first column during one of said arithmetic unit during one of said predetermined timing intervals; said arithmetic unit performing arithmetic data processing during each of said predetermined time intervals.

6. A VLSI circuit structure as defined in claim 5 wherein each of said one-dimensional DCT circuits comprises six partitions.

7. A VLSI circuit structure as defined in claim 6 wherein each of said one-dimensional DCT circuits determines scaled DFT coefficients $S_0$–$S_7$ from input elements $a_0$–$a_7$ in said six partitions as follows:

(a) in said first partition: $b_0=a_0+a_7$, $b_1=a_1+a_6$, $b_2=a_3-a_4$, $b_3=a_1-a_6$, $b_4=a_2+a_5$, $b_5=a_3+a_4$, $b_6=a_2-a_5$, $b_7=a_0-a_7$;

(b) in said second partition: $c_0=b_0+b_5$, $c_1=b_1-b_4$, $c_2=b_2+b_6$, $c_3=b_1+b_4$, $c_4=b_0-b_5$, $c_5=b_3+b_7$, $c_6=b_3+b_6$, $c_7=b_7$;

(c) in said third partition: $d_0=c_0+c_3$, $d_1=c_0-c_3$, $d_2=c_2$, $d_3=c_1+c_4$, $d_4=c_2-c_5$, $d_5=c_4$, $d_6=c_5$, $d_7=c_6$; $d_8=C_7$;

(d) in said fourth partition: $e_0=d_0$, $e_1=d_1$, $e_2=m3*d_2$, $e_3=m1*d_7$, $e_4=m4*d_6$, $e_5=d_5$, $e_6=m1*d_3$, $e_7=m2*d_4$, $e_8=d_8$;

(e) in said fifth partition: $f_0=e_0$, $f_1=e_1$, $f_2=e_5+e_6$, $f_3=e_5-e_6$, $f_4=e_3+e_8$, $f_5=e_8-e_3$, $f_6=e_2+e_7$, $f_7=e_4+e_7$; and (f) in said sixth partition: $S_0=f_0$, $S_1=f_4+f_7$, $S_2=f_2$, $S_3=f_5-f_5$, $S_4=f_1$, $S_5=f_5+f_6$, $S_6=f_3$, $S_7=f_4-f_7$;

where $m_1$, $m_2$, $m_3$, and $m_4$ are multipliers.

8. A VLSI circuit structure as defined in claim 7 wherein $m_1=\cos(4\pi/16)$, $m_2=\cos(6\pi/16)$, $m_3=\cos(2\pi/16)-\cos(6\pi/16)$, and $m_4=\cos(2\pi/16)+\cos(6\pi/16)$.

9. A VLSI circuit structure as defined in claim 1, wherein said entropy encoder module comprises a zero-runlength coder, a category selection circuit, strip logic, a Huffman encoder, and a data packer; said zero-runlength coder being designed to receive the DCT image output signals and generate a set of coded data signals which are directed to said category selection circuit; said category selection circuit being designed to receive the coded data signals, generate category signals, and to direct the coded data signals and the category signals to said strip logic; said strip logic being designed to strip redundant portions of the coded data signals and the category signals and to direct the stripped signals to said Huffman encoder; said Huffman encoder being designed to replace the stripped coded data and category signals with corresponding Huffman codes, and to output said Huffman codes to said data packer; said data packer being designed to receive said Huffman codes and to generate said compressed image data signals.

10. A VLSI circuit structure as defined in claim 9, wherein each of said zero-runlength coder category selection circuit, strip logic, Huffman encoder and data packer comprises a predetermined number of data processing stages, and wherein each of said processing stages performs a data processing step during each of said predetermined timing intervals.

11. A VLSI circuit structure as defined in claim 9, wherein said data packer comprises two registers, two data shifters, two multiplexers, and control logic, all in circuit communication to convert variable length compressed data into fixed length compressed data.

12. A VLSI circuit structure as defined in claim 9, wherein said Huffman encoder comprises a plurality of random access memory modules connected in a linear pipeline fashion, each of said random access memory modules for storing therein a subset of Huffman codes.

13. A VLSI circuit structure for compressing an image as defined in claim 12, wherein said random access memory modules are addressed using runlength, category pairs.

14. A VLSI circuit structure for compressing an image as defined in claim 13, wherein said plurality of random access memory modules comprises one random access memory module for accessing Huffman codes for DC coefficients and four random access memory module for accessing Huffman codes for AC coefficients.

15. A VLSI circuit structure as defined in claim 9 wherein said category selection circuit consists entirely of combinational logic elements.

16. A VLSI circuit structure as defined in claim 9 wherein said category selection circuit receives coded data signals in the form of a 12-bit coefficient signal, $coeff_0$–$coeff_{11}$; wherein said category selection circuit outputs a 4-bit category signal, $cat_0$–$cat_3$; and wherein said 4-bit category signal is determined from said 12-bit coefficient signal using combinational logic elements in circuit communication, said combinational logic elements implementing the following logic functions:

$A_0 = coeff_0 \odot coeff_{11}$,
$A_1 = coeff_1 \odot coeff_{11}$,
$A_2 = coeff_2 \odot coeff_{11}$,
$A_3 = coeff_3 \odot coeff_{11}$,
$A_4 = coeff_4 \odot coeff_{11}$,
$A_5 = coeff_5 \odot coeff_{11}$,
$A_6 = coeff_6 \odot coeff_{11}$,
$A_7 = coeff_7 \odot coeff_{11}$,
$A_8 = coeff_8 \odot coeff_{11}$,
$A_9 = coeff_9 \odot coeff_{11}$,
$A_{10} = coeff_{10} \odot coeff_{11}$,
$B_0 = A_0\, A_1$, $B_1 = A_1\, A_2$, $B_2 = A_2\, A_3$, $B_3 = A_3\, A_4$, $B_4 = A_4\, A_5$, $B_5 = A_5\, A_6$, $B_6 = A_6\, A_7$, $B_7 = A_7\, A_8$, $B_8 = A_8\, A_9$, $B_9 = A_9\, A_{10}$;
$C_0 = \overline{B}_0\, B_1$, $C_1 = \overline{B}_2\, B_3$, $C_2 = \overline{B}_4\, B_5$, $C_3 = \overline{B}_6\, B_7$, $C_4 = \overline{B}hd\, 8B_9$;
$D_0 = B_1\, B_3$, $D_1 = C_2\, B_7$; and
$cat_0 = C_0 + C_1 + C_2 + C_3 + C_4 + \overline{A}_{10}$, $cat_1 = D_0 + D_1 + \overline{B}_9$, $cat_2 = B_7\, \overline{B}_3$, $cat_3 = \overline{B}_7$.

17. A VLSI circuit structure as defined in claim 1, wherein said entropy encoder module comprises a data packer, said data packer including two registers, two data shifters, two multiplexers, and control logic, all in circuit communication to convert variable length compressed data into fixed length compressed data.

18. A VLSI circuit structure as defined in claim 1 wherein said entropy encoder module comprises a Huffman encoder, said Huffman encoder including a plurality of random access memory modules connected in a linear pipeline fashion, each of said random access memory modules for storing therein a subset of Huffman codes.

19. A VLSI circuit structure for compressing an image as defined in claim 18, wherein said random access memory modules are addressed using runlength, category pairs.

20. A VLSI circuit structure for compressing an image as defined in claim 19, wherein said plurality of random access memory modules comprises one random access memory module for accessing Huffman codes for DC coefficients and four random access memory module for accessing Huffman codes for AC coefficients.

21. A VLSI circuit structure as defined in claim 1 wherein said entropy encoder module comprises a category selection circuit, said category selection circuit consisting entirely of combinational logic elements.

22. A VLSI circuit structure as defined in claim 1 wherein said entropy encoder module comprises a category selection circuit, said category selection circuit receiving coded data signals in the form of a 12-bit coefficient signal, $coeff_0$–$coeff_{11}$; wherein said category selection circuit outputs a 4-bit category signal, $cat_0$–$cat_3$; and wherein said 4-bit category signal is determined from said 12-bit coefficient signal using combinational logic elements in circuit communication, said combinational logic elements implementing the following logic functions:

$A_0 = coeff_0 \odot coeff_{11}$, $A_1 = coeff_1 \odot coeff_{11}$, $A_2 = coeff_2 \odot coeff_{11}$, $A_3 = coeff_3 \odot coeff_{11}$, $A_4 = coeff_4 \odot coeff_{11}$, $A_5 = coeff_5 \odot coeff_{11}$, $A_6 = coeff_6 \odot coeff_{11}$, $A_7 = coeff_7 \odot coeff_{11}$, $A_8 = coeff_8 \odot coeff_{11}$, $A_9 = coeff_9 \odot coeff_{11}$, $A_{10} = coeff_{10} \odot coeff_{11}$, $B_0 = A_0\,A_1$, $B_1 = A_1\,A_2$, $B_2 = A_2\,A_3$, $B_3 = A_3\,A_4$, $B_4 = A_4\,A_5$, $B_5 = A_5\,A_6$, $B_6 = A_6\,A_7$, $B_7 = A_7\,A_8$, $B_8 = A_8\,A_9$, $B_9 = A_9\,A_{10}$;

$C_0 = \overline{B}_0\,B_1$, $C_1 = \overline{B}_0\,B_3$, $C_2 = \overline{B}_4\,B_5$, $C_3 = \overline{B}_6\,B_7$, $C_4 = \overline{B}hd 8B_9$;

$D_0 = B_1\,B_3$, $D_1 = C_2\,B_7$; and $cat_0 = C_0 + C_1 + C_2 + C_3 + C_4 + \overline{A}_{10}$, $cat_1 = D_0 + D_1 + \overline{B}_9$, $cat_2 = B_7\,\overline{B}_3$, $cat_3 = \overline{B}_7$.

23. A VLSI circuit structure as defined in claim 1 wherein said DCT module comprises at least one one-dimensional DCT circuit, each of said at least one one-dimensional DCT circuits comprising six partitions.

24. A VLSI circuit structure as defined in claim 23 wherein each of said at least one one-dimensional DCT circuits determines scaled DFT coefficients $S_0$–$S_7$ from input elements $a_0$–$a_7$ in said six partitions as follows:

(a) in said first partition: $b_0 = a_0 + a_7$, $b_1 = a_1 + a_6$, $b_2 = a_3 - a_4$, $b_3 = a_1 - a_6$, $b_4 = a_2 + a_5$, $b_5 = a_3 + a_4$, $b_6 = a_2 - a_5$, $b_7 = a_0 - a_7$;

(b) in said second partition: $c_0 = b_0 + b_5$, $c_1 = b_1 - b_4$, $c_2 = b_2 + b_6$, $c_3 = b_1 + b_4$, $c_4 = b_0 - b_5$, $c_5 = b_3 + b_7$, $c_6 = b_3 + b_6$, $c_7 = b_7$;

(c) in said third partition: $d_0 = c_0 + c_3$, $d_1 = c_0 - c_3$, $d_2 = c_2$, $d_3 = c_1 + c_4$, $d_4 = c_2 - c_5$, $d_5 = c_4$, $d_6 = c_5$, $d_7 = c_6$; $d_8 = C_7$;

(d) in said fourth partition: $e_0 = d_0$, $e_1 = d_1$, $e_2 = m3 * d_2$, $e_3 = m1 * d_7$, $e_4 = m4 * d_6$, $e_5 = d_5$, $e_6 = m1 * d_3$, $e_7 = m2 * d_4$, $e_8 = d_8$;

(e) in said fifth partition: $f_0 = e_0$, $f_1 = e_1$, $f_2 = e_5 + e_6$, $f_3 = e_5 - e_6$, $f_4 = e_3 + e_8$, $f_5 = e_8 - e_3$, $f_6 = e_2 + e_7$, $f_7 = e_4 + e_7$; and (f) in said sixth partition: $S_0 = f_0$, $S_1 = f_4 + f_7$, $S_2 = f_2$, $S_3 = f_5 - f_5$, $S_4 = f_1$, $S_5 = f_5 + f_6$, $S_6 = f_3$, $S_7 = f_4 - f_7$;

where $m_1$, $m_2$, $m_3$, and $m_4$ are multipliers.

25. A VLSI circuit structure as defined in claim 24 wherein $m_1 = \cos(4\pi/16)$, $m_2 = \cos(6\pi/16)$, $m_3 = \cos(2\pi/16) - \cos(6\pi/16)$, and $m_4 = \cos(2\pi/16) + \cos(6\pi/16)$.

26. A VLSI circuit structure for implementing JPEG image compression standard on a VLSI chip, comprising: a DCT module, an entropy encoder module, input means for directing image pixel data signals to said DCT module, said DCT module designed to transform said image pixel data signals to produce DCT output signals in a form suitable for processing by said entropy encoder module and to transmit said DCT output signals directly to said entropy encoder module, said entropy encoder module designed to process said DCT output signals to produce compressed image output data signals, and timing means for providing timing control signals at predetermined timing intervals to control the processing of said image pixel data signals; said VLSI circuit structure being designed such that during each of said predetermined timing intervals said image pixel data signals are being directed to the DCT module, said DCT output signals are being transmitted directly from said DCT module to said entropy encoder module and said compressed image output data signals are being output from said entropy encoder module, so that during normal operation, said image pixel data signals are being processed in a manner which is fully pipelined across the entire VLSI circuit structure;

wherein said predetermined timing intervals are clock cycles at a frequency of at least 100 MHz;

wherein said DCT module comprises a DCT section for receiving said image pixel data signals input thereto and for performing DCT computations therewith to produce DCT data signals, a quantization section for scaling the DCT data signals and a reordering logic section for reordering the DCT data signals and to produce the DCT output signals;

wherein said DCT section further includes a level shifter for receiving said image pixel data input signals, and a pair of one-dimensional DCT circuits with a transpose buffer between them, to effect DCT computations or data movements related to said DCT computations during each of said timing intervals; and wherein each of said one-dimensional DCT circuits comprises a plurality of partitions, each of said partitions includes a register set, an arithmetic unit and associated control logic; each register set comprising two columns of registers; one column for receiving signals being input to the register set during each of said predetermined timing intervals and the other column for receiving signals from the first column during one of said predetermined timing intervals; said arithmetic unit performing arithmetic data processing during each of said predetermined time intervals.

27. A VLSI circuit structure as defined in claim 26, wherein said entropy encoder module comprises: a zero-runlength coder, a category selection circuit, strip logic, a Huffman encoder, and a data packer; said zero-runlength coder being designed to receive the DCT image output signals and generate a set of coded data signals which are directed to said category selection circuit; said category selection circuit being designed to receive the coded data signals, generate category signals, and to direct the coded data signals and the category signals to said strip logic; said strip logic being designed to strip redundant portions of the coded data signals and the category signals and to direct the stripped signals to said Huffman encoder; said Huffman encoder being designed to replace the stripped coded data and category signals with corresponding Huffman codes, and to output said Huffman codes to said data packer; said data packer being designed to receive said Huffman codes and to generate said compressed image data signals according to the JPEG image compression standard.

28. A VLSI circuit structure as defined in claim 27, wherein each of said zero-runlength coder category selection circuit, strip logic, Huffman encoder and data packer comprises a predetermined number of data processing stages, and wherein each of said processing stages performs a data processing step during each of said predetermined timing intervals.

29. A VLSI circuit structure as defined in claim 27 wherein said category selection circuit consists entirely of combinational logic elements.

30. A VLSI circuit structure as defined in claim 27 wherein said category selection circuit receives coded data signals in the form of a 12-bit coefficient signal, $coeff_0$–$coeff_{11}$; wherein said category selection circuit outputs a 4-bit category signal, $cat_0$–$cat_3$; and wherein said 4-bit category signal is determined from said 12-bit coefficient signal using combinational logic elements in circuit communication, said combinational logic elements implementing the following logic functions:

$A_0 = coeff_0 \odot coeff_{11}$,
$A_1 = coeff_1 \odot coeff_{11}$,
$A_2 = coeff_2 \odot coeff_{11}$,
$A_3 = coeff_3 \odot coeff_{11}$,
$A_4 = coeff_4 \odot coeff_{11}$,
$A_5 = coeff_5 \odot coeff_{11}$,
$A_6 = coeff_6 \odot coeff_{11}$,
$A_7 = coeff_7 \odot coeff_{11}$,
$A_8 = coeff_8 \odot coeff_{11}$,
$A_9 = coeff_9 \odot coeff_{11}$,
$A_{10} = coeff_{10} \odot coeff_{11}$,
$B_0 = A_0 A_1$, $B_1 = A_1 A_2$, $B_2 = A_2 A_3$, $B_3 = A_3 A_4$, $B_4 = A_4 A_5$, $B_5 = A_5 A_6$, $B_6 = A_6 A_7$, $B_7 = A_7 A_8$, $B_8 = A_8 A_9$, $B_9 = A_9 A_{10}$;
$C_0 = \bar{B}_0 B_1$, $C_1 = \bar{B}_0 B_1$, $C_2 = \bar{B}_4 B_5$, $C_3 = \bar{B}_6 B_7$, $C_4 = \bar{B}hd 8B_9$; $D_0 = B_1 B_3$, $D_1 = C_2 B_7$; and
$cat_0 = C_0 + C_1 + C_2 + C_3 + C_4 + \bar{A}_{10}$, $cat_1 = D_0 + D_1 + \bar{B}_9$, $cat_2 = B_7 \bar{B}_3$, $cat_3 = \bar{B}_7$.

31. A VLSI circuit structure as defined in claim 26 wherein each of said one-dimensional DCT circuits comprises six partitions.

32. A VLSI circuit structure as defined in claim 31 wherein each of said one-dimensional DCT circuits determines scaled DFT coefficients $S_0$–$S_7$ from input elements $a_0$–$a_7$ in said six partitions as follows:

(a) in said first partition: $b_0 = a_0 + a_7$, $b_1 = a_1 + a_6$, $b_2 = a_3 - a_4$, $b_3 = a_1 - a_6$, $b_4 = a_2 + a_5$, $b_5 = a_3 + a_4$, $b_6 = a_2 - a_5$, $b_7 = a_0 - a_7$;

(b) in said second partition: $c_0 = b_0 + b_5$, $c_1 = b_1 - b_4$, $c_2 = b_2 + b_6$, $c_3 = b_1 + b_4$, $c_4 = b_0 - b_5$, $c_5 = b_3 + b_7$, $c_6 = b_3 + b_6$, $c_7 = b_7$;

(c) in said third partition: $d_0 = c_0 + c_3$, $d_1 = c_0 - c_3$, $d_2 = c_2$, $d_3 = c_1 + c_4$, $d_4 = c_2 - c_5$, $d_5 = c_4$, $d_6 = c_5$, $d_7 = c_6$; $d_8 = c_7$;

(d) in said fourth partition: $e_0 = d_0$, $e_1 = d_1$, $e_2 = m3*d_2$, $e_3 = m1*d_7$, $e_4 = m4*d_6$, $e_5 = d_5$, $e_c = m1*d_3$, $e_7 = m2*d_4$, $e_8 = d_8$;

(e) in said fifth partition: $f_0 = e_0$, $f_1 = e_1$, $f_2 = e_5 + e_6$, $f_3 = e_5 - e_6$, $f_4 = e_3 + e_8$, $f_5 = e_8 - e_3$, $f_6 = e_2 + e_7$, $f_7 = e_4 + e_7$; and (f) in said sixth partition: $S_0 = f_0$, $S_1 = f_4 + f_7$, $S_2 = f_2$, $S_3 = f_5 - f_6$, $S_4 = f_1$, $S_5 = f_5 + f_6$, $S_6 = f_3$, $S_7 = f_4 - f_7$;

where $m_1$, $m_2$, $m_3$, and $m_4$ are multipliers.

33. A VLSI circuit structure as defined in claim 32 wherein $m_1 = \cos(4\pi/16)$, $m_2 = \cos(6\pi/16)$, $m_3 = \cos(2\pi/16) - \cos(6\pi/16)$, and $m_4 = \cos(2\pi/16) + \cos(6\pi/16)$.

34. A VLSI circuit structure for compressing an image, comprising:

(a) image alteration means for altering image data thereby generating a stream of altered image data, said image alteration means including DCT means for performing a two-dimensional DCT on image data thereby generating a stream of DCT image data, said DCT means including zig-zag reordering logic;

(b) encoding means for entropy encoding the stream of altered image data at a rate that allows said encoding means to accept the stream of altered image data directly from said image alteration means; and (c) timing control means for providing timing control signals at predetermined timing intervals to control the processing of data across at least said DCT means and said encoding means, said reordering logic responding to the timing control signals by reordering without acting as a buffer for synchronizing operations between said image alteration means and said encoding means.

35. A VLSI circuit structure for compressing an image as defined in claim 34 wherein said image alteration means further comprises:

(a) quantizing means for quantizing the stream of DCT image data thereby generating a stream of quantized DCT image data a rate that allows said quantizing means to accept the stream 0f DCT image data directly from said DCT means; and (b) reordering means for reordering said stream of quantized DCT image data thereby forming a stream of reordered quantized DCT image data a rate that allows said reordering means to accept the stream of quantized DCT image data directly from said quantizing means.

36. A VLSI circuit structure as set forth in claim 34, wherein said image alteration means comprises a plurality of one-dimensional DCT circuits in circuit communication; wherein each of said one-dimensional DCT circuits includes a plurality of partitions, each of said partitions having a register set, an arithmetic unit and associated control logic; and wherein each register set includes two columns of registers, one column for receiving signals being input to the register set during each of said predetermined timing intervals and the other column for receiving signals from the first column during one of said arithmetic unit during one of said predetermined timing intervals; said arithmetic unit performing arithmetic data processing during each of a plurality of predetermined time intervals.

37. A VLSI circuit structure as defined in claim 34, wherein said encoder means comprises a zero-runlength coder, a category selection circuit, strip logic, a Huffman encoder, and a data packer; said zero-runlength coder being designed to receive the DCT image output signals and generate a set of coded data signals which are directed to said category selection circuit; said category selection circuit being designed to receive the coded data signals, generate category signals, and to direct the coded data signals and the category signals to said strip logic; said strip logic being designed to strip redundant portions of the coded data signals and the category signals and to direct the stripped signals to said Huffman encoder; said Huffman encoder being designed to replace the stripped coded data and category signals with corresponding Huffman codes, and to output said Huffman codes to said data packer; said data packer being designed to receive said Huffman codes and to generate said compressed image data signals.

38. A VLSI circuit structure as defined in claim 37, wherein each of said zero-runlength coder category selection circuit, strip logic, Huffman encoder and data packer comprises a predetermined number of data processing stages, and wherein each of said processing stages performs a data processing step during each of said predetermined timing intervals.

39. A VLSI circuit structure for compressing an image as defined in claim 34, wherein said encoding means comprises zero-runlength encoding means for determining a set of coded data signals from the stream of altered image data.

40. A VLSI circuit structure for compressing an image as defined in claim 34, wherein said encoding means comprises category selection means for associating a category signal with the coded data signals.

41. A VLSI circuit structure for compressing an image as defined in claim 34, wherein said encoding means comprises strip logic means for stripping redundant portions of the coded data signals and category signals.

42. A VLSI circuit structure for compressing an image as defined in claim 34, wherein said encoding means comprises Huffman encoding means for replacing various signals with corresponding Huffman codes.

43. A VLSI circuit structure for compressing an image as defined in claim 34, wherein said encoding means comprises data packer means for converting variable length compressed data into fixed length compressed data.

44. A VLSI circuit structure for compressing an image as defined in claim 34, wherein said encoding means comprises:

(a) zero-runlength encoding means for determining a set of coded data signals from the stream of altered image data;

(b) category selection means for associating a category signal with the coded data signals;

(c) strip logic means for stripping redundant portions of the coded data signals and category signals;

(d) Huffman encoding means for replacing the stripped coded data and category signals with corresponding Huffman codes; and (e) data packer means for converting variable length compressed data into fixed length compressed data.

45. A VLSI circuit structure for compressing an image, comprising:

(a) image alteration means for altering image data thereby generating a stream of altered image data, said image alteration means including DCT means for performing a two-dimensional DCT on image data thereby generating a stream of DCT image data, and said DCT means including zig-zag reordering logic;

(b) encoding means for entropy encoding the stream of altered image data at a rate that allows said encoding means to be fully pipelined with said image alteration means; and (c) timing control means for providing timing control signals at predetermined timing intervals to control the processing of data across at least said DCT means and said encoding means, said reordering logic responding to the timing control signals by reordering without acting as a buffer for synchronizing operations between said image alteration means and said encoding means.

* * * * *